(12) United States Patent
Cheon et al.

(10) Patent No.: US 9,113,456 B2
(45) Date of Patent: *Aug. 18, 2015

(54) METHOD AND DEVICE FOR TRANSMITTING UPLINK SIGNAL INCLUDING DATA AND CONTROL INFORMATION VIA UPLINK CHANNEL

(71) Applicant: LG ELECTRONICS INC., Seoul (KR)

(72) Inventors: Byeong Geol Cheon, Anyang-Si (KR); Dae Won Lee, Anyang-Si (KR); Ki Jun Kim, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

This patent is subject to a terminal disclaimer.

(21) Appl. No.: 13/742,204

(22) Filed: Jan. 15, 2013

(65) Prior Publication Data

US 2013/0128843 A1 May 23, 2013

Related U.S. Application Data

(63) Continuation of application No. 13/023,351, filed on Feb. 8, 2011, now Pat. No. 8,406,148, which is a continuation of application No. 12/472,162, filed on May 26, 2009, now Pat. No. 7,912,133.

(60) Provisional application No. 61/056,068, filed on May 27, 2008, provisional application No. 61/074,679, filed on Jun. 23, 2008.

(30) Foreign Application Priority Data

Apr. 16, 2009 (KR) .......................... 10-2009-0033078

(51) Int. Cl.
*H04L 1/18* (2006.01)
*H04W 72/04* (2009.01)

(Continued)

(52) U.S. Cl.
CPC ......... *H04W 72/0413* (2013.01); *H04L 1/0072* (2013.01); *H04L 1/1819* (2013.01);
(Continued)

(58) Field of Classification Search
None
See application file for complete search history.

(56) References Cited

U.S. PATENT DOCUMENTS

| 7,912,133 B2 | 3/2011 | Cheon et al. |
| 2002/0071407 A1 | 6/2002 | Koo et al. |

(Continued)

FOREIGN PATENT DOCUMENTS

| CN | 1716837 A | 1/2006 |
| CN | 101044710 A | 9/2007 |

(Continued)

OTHER PUBLICATIONS

3rd Generation Partnership Project; Technical Specification Group Radio Access Network; Evolved Universal Terrestrial Radio Access (E-UTRA); Multiplexing and channel coding (Release 8), 3GPP TS 36.212 V8.6.0 (Mar. 13, 2009), pp. 1-59.

(Continued)

*Primary Examiner* — Christine Duong
(74) *Attorney, Agent, or Firm* — Birch, Stewart, Kolasch & Birch, LLP

(57) ABSTRACT

A method and device for transmitting a first and second uplink signal, each having data and control information is provided. The method includes channel encoding the control information of the second uplink signal based on a number of symbols of control information to produce. The channel encoding includes determining the number of symbols in accordance with a payload size of the data of the first uplink signal and a total number of transmissible symbols of a Physical Uplink Shared Channel (PUSCH) of the first uplink signal.

16 Claims, 17 Drawing Sheets

(51) Int. Cl.
  *H04L 1/00* (2006.01)
  *H04L 1/16* (2006.01)
  *H04L 29/06* (2006.01)

(52) U.S. Cl.
  CPC ........ *H04L65/1069* (2013.01); *H04L 65/4084* (2013.01); *H04L 1/0031* (2013.01); *H04L 1/0071* (2013.01); *H04L 1/1671* (2013.01); *H04L 1/1822* (2013.01); *H04L 65/1006* (2013.01); *H04L 65/1016* (2013.01)

(56) References Cited

U.S. PATENT DOCUMENTS

| | | |
|---|---|---|
| 2006/0062217 A1 | 3/2006 | Kim et al. |
| 2006/0258364 A1 | 11/2006 | Usuda et al. |
| 2008/0095106 A1 | 4/2008 | Malladi et al. |
| 2009/0006925 A1 | 1/2009 | Pan |
| 2009/0028129 A1 | 1/2009 | Pi et al. |
| 2009/0046805 A1 | 2/2009 | Kim et al. |
| 2009/0047984 A1 | 2/2009 | Gollamudi et al. |
| 2009/0097466 A1 | 4/2009 | Lee et al. |
| 2009/0204863 A1 | 8/2009 | Kim et al. |
| 2010/0165931 A1 | 7/2010 | Nimbalker et al. |
| 2010/0195624 A1 | 8/2010 | Zhang et al. |
| 2011/0310853 A1 | 12/2011 | Yin et al. |

FOREIGN PATENT DOCUMENTS

| | | |
|---|---|---|
| EP | 0 944 199 A1 | 6/1999 |
| EP | 1 180 907 A2 | 2/2002 |
| EP | 2 003 811 A2 | 12/2008 |
| EP | 2 051 426 A1 | 4/2009 |
| EP | 2 053 893 A1 | 4/2009 |
| EP | 2 129 030 A1 | 12/2009 |
| KR | 10-2003-0011136 | 2/2003 |
| KR | 10-2007-0059908 B1 | 6/2007 |
| RE | 10-2006-0024954 | 3/2006 |
| RU | 2324290 C2 | 5/2008 |
| WO | WO 2008/014275 A2 | 1/2008 |
| WO | WO 2008/018468 A1 | 2/2008 |
| WO | WO 2008/054735 A1 | 5/2008 |
| WO | WO 2009/022566 A1 | 2/2009 |
| WO | WO 2009/145525 A2 | 12/2009 |

OTHER PUBLICATIONS

A. Ghosh et al., The 18the Annual IEEE Symposium of Personal, Indoor and Mobile Radio Communications, "Uplink Control Channel Design for 3GPP LTE", Sep. 2007.

LGE, "Correction of control MCS offset and SRS symbol puncturing", 3GPP TSG-RAN1 Meeting #55bis, Ljubljana, Slovenia, Jan. 12-16, 2008, R1-090420, pp. 1-8.

Nokia Siemens Networks et al., "Simulation Results: Linkage between PUSCH MCS and amount of resources for control on PUSCH", 3GPP TSG RAN WG1 Meeting #53, R1-081853, May 5-9, 2008, 18 pages.

RELATED ART

METHOD AND DEVICE FOR TRANSMITTING UPLINK SIGNAL INCLUDING DATA AND CONTROL INFORMATION VIA UPLINK CHANNEL

CROSS-REFERENCE TO RELATED APPLICATIONS

This application is a continuation of co-pending U.S. application Ser. No. 13/023,351, filed on Feb. 8, 2011, which is a continuation of U.S. application Ser. No. 12/472,162, filed on May 26, 2009, which claims the benefit of Korean Patent Application No. 10-2009-0033078, filed on Apr. 16, 2009 and U.S. Provisional Application Ser. Nos. 61/056,068, filed on May 27, 2008, and 61/074,679, filed on Jun. 23, 2008. The entire contents of each of these applications are incorporated herein by reference.

BACKGROUND OF THE INVENTION

1. Field of the Invention

The present invention relates to a method for transmitting an uplink signal including control information and data through an uplink channel.

2. Discussion of the Related Art

Channel Structure and Mapping of LTE

The link channel structure and mapping of the $3^{rd}$ generation partnership project (3GPP) long term evolution (LTE) will now be described. A downlink physical channel includes a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH). An uplink physical channel includes a physical uplink shared channel (PUSCH), a physical uplink control channel (PUCCH), and a physical random access channel (PRACH).

A downlink transport channel includes a broadcast channel (BCH), a downlink shared channel (DL-SCH), a paging channel (PCH), and a multicast channel (MCH). An uplink transport channel includes an uplink shared channel (UL-SCH) and a random access channel (RACH).

FIG. 1 illustrates a mapping relationship between a downlink physical channel and a downlink transport channel. FIG. 2 illustrates a mapping relationship between an uplink physical channel and an uplink transport channel. The above-described physical channels and transport channels are mapped to each other as illustrated in FIGS. 1 and 2.

Meanwhile, a logical channel classified as a control channel includes a broadcast control channel (BCCH), a paging control channel (PCCH), a common control channel (CCCH), a multicast control channel (MCCH), and a dedicated control channel (DCCH). A logical channel classified as a traffic channel includes a dedicated traffic channel (DTCH) and a multicast traffic channel (MTCH).

FIG. 3 illustrates a mapping relationship between a downlink transport channel and a downlink logical channel. FIG. 4 illustrates a mapping relationship between an uplink transport channel and an uplink logical channel.

Slot Structure of LTE

In a cellular orthogonal frequency division multiplexing (OFDM) radio packet communication system, an uplink/downlink data packet is transmitted in units of subframes. One subframe is defined as a prescribed time duration including a plurality of OFDM symbols.

The 3GPP supports radio frame structure type 1 applicable to frequency division duplex (FDD) and radio frame structure type 2 applicable to time division duplex (TDD).

FIG. 5 illustrates the radio frame structure type 1. The radio frame type 1 consists of 10 subframes. One subframe consists of 2 slots.

FIG. 6 illustrates the radio frame structure type 2. The radio frame type 2 is comprised of two half-frames. Each half-frame consists of 5 subframes, a downlink pilot time slot (DwPTS), a guard period (GP), and an uplink pilot time slot (UpPTS). One subframe consists of two slots. The DwPTS is used for an initial cell search, for synchronization or for channel estimation. The UpPTS is used for channel estimation in an evolved Node B (eNB), uplink transmission synchronization of a User Equipment (UE). The GP is an interval for eliminating interference caused by multi-path delay of downlink signal between uplink and downlink. Namely, irrespective of a radio frame type, one subframe consists of two slots.

FIG. 7 illustrates a downlink slot structure of LTE. As illustrated in FIG. 7, a signal transmitted in each slot may be represented by a resource grid comprised of $N_{RB}^{DL} N_{SC}^{RB}$ subcarriers and $N_{symb}^{DL}$ OFDM symbols. At this time, $N_{RB}^{DL}$ denotes the number of resource blocks (RBs) in a downlink, $N_{SC}^{RB}$ denotes the number of subcarriers constituting one RB, and $N_{symb}^{DL}$ denotes the number of OFDM symbols in one downlink slot.

FIG. 8 illustrates an uplink slot structure of LTE. As illustrated in FIG. 8, a signal transmitted in each slot may be represented by a resource grid comprised of $N_{RB}^{UL} N_{SC}^{RB}$ subcarriers and $N_{UL}^{symb}$ OFDM symbols. At this time, $N_{RB}^{UL}$ denotes the number of resource blocks (RBs) in an uplink, $N_{SC}^{RB}$ denotes the number of subcarriers constituting one RB, and $N_{symb}^{UL}$ denotes the number of OFDM symbols in one uplink slot. A resource element refers to one subcarrier and one OFDM symbol as a resource unit defined by indexes (a, b) (where a is an index on a frequency domain and b is an index on a time domain) within the uplink slot and the downlink slot.

Meanwhile, the eNB transmits control information to a downlink to control a UL-SCH which is an uplink transport channel. The control information transmitted to the downlink informs the UE of the number of RBs transmitted through the UL-SCH and a modulation order. In addition, when data is transmitted to an uplink, the control information informs the UE of a payload size of the data. The payload size may be defined as the sum of the size of information (e.g., the size of data, or the size of control information) transmitted from a medium access control (MAC) layer and the size of cyclic redundancy check (CRC) attached arbitrarily to the information in a physical layer. The payload of the control information may not include the size of the CRC because the CRC cannot be attached to the control information according to the size of the control information before the CRC is attached to the control information. Specifically, if the size of the control information to which the CRC is not attached is smaller than or equal to 11 bits, the CRC is not attached to the control information. In addition, if the size of the control information to which the CRC is not attached is greater than or equal to 12 bits, the CRC is attached to the control information.

Data and control information (e.g., Channel Quality Information (CQI)/Precoding Matrix Indicator (PMI) or Rank Indication (RI)) may be multiplexed together and transmitted through the UL-SCH. In the conventional system, a scheme for encoding the data differs from a scheme for encoding the control information. Furthermore, in the conventional system, a block error rate (BLER) of the data and a BLER of the control information, demanded by the eNB, may differ from each other.

Furthermore, in the conventional system, even though a code rate of data is known using the modulation order, the number of RBs, and the payload size of data, a code rate of control information cannot be known. Moreover, since the data and the control information are multiplexed together and then transmitted through the UL-SCH, the number of transmitted symbols of the data cannot be known.

To solve such problems, the conventional system was upgraded such that the code rate of the control information is compensated for by an offset that can be changed by the eNB as compared with the code rate of the data.

Even if the system is managed as described above, the code rate of the data may be varied by information multiplexed with the data. Moreover, if the data is not transmitted, the UE cannot estimate a code rate of CQI/PMI or rank indication for example. Accordingly, a method for calculating a code rate of transmitted information (e.g., CQI/PMI or rank indication) according to a combination of information transmitted through the UL-SCH is demanded.

Also, in the conventional communication system, if an error occurs in a data packet due to failure of receipt after the data packet is transmitted, the corresponding data packet is re-transmitted.

Also, in the case where re-transmission occurs, if decoding is performed using an initially received data packet and a data packet received by re-transmission, a success probability of receiving the data packet is increased even though not all resources employed when the data packet is initially transmitted are used.

For example, when the communication system operates such that the initial data packet is transmitted without errors with a probability of 90%, the system does not encounter any problem even when the data packet is re-transmitted at a code rate higher than a code rate of the initial data packet. Transmitting a data packet at a high code rate means that less physical transmission resources are used than during the initial transmission of the data packet.

If a code rate of CQI/PMI or rank indication is calculated using the total number of symbols of the data when re-transmitting the data packet, a code rate for stably transmitting the CQI/PMI or rank indication may not be set. Therefore, when data is re-transmitted, a code rate setting method for stably transmitting the CQI/PMI or rank indication is demanded.

In summary, in an attempt to save bandwidth while retransmitting, a conventional mobile is commanded by a base station to reduce the amount of total information bits (i.e., data and control bits) that are retransmitted. This does not result in an increased error rate for the data bits because the retransmitted payload data is soft combined with the original payload data. However, corresponding control data of the two signals are not combined for decoding/demodulation. That is, in the conventional system, the truncated control bits of the retransmitted signal are used for code rate setting, resulting in degraded performance. Thus, the present invention compensates for this degradation in performance by reusing the original control data in a novel fashion.

SUMMARY OF THE INVENTION

Accordingly, the present invention is directed to a method and device for transmitting a first and second uplink signal, each having data and control information. The method includes channel encoding the control information of the second uplink signal based on a number of symbols of control information to produce. The channel encoding includes determining the number of symbols in accordance with a payload size of the data of the first uplink signal and a total number of transmissible symbols of a Physical Uplink Shared Channel (PUSCH) of the first uplink signal.

Preferably, the step of determining may include determining the number of symbols in accordance with a payload size of the control information of the second uplink signal and an offset value applied to the control information of the second uplink signal.

Preferably, the method may further include channel encoding the data of the second uplink signal to produce second channel encoded data; channel interleaving the first and second channel encoded data to generate the second uplink signal; and transmitting the second uplink signal.

Preferably, the number of symbols of control information may satisfy the expression:

$$M_X = \left\lceil N_X \cdot \beta_X \cdot \frac{M_{RE}^{PUSCH}}{N_{data}} \right\rceil$$

where $M_X$ is the number of the symbols of the control information, $N_X$ is the payload size of the control information, $\beta_X$ is the offset value, $N_{data}$ is the size of the data of the first uplink signal, $M_{RE}^{PUSCH}$ is the total number of transmissible symbols of Physical Uplink Shared Channel (PUSCH) of the first uplink signal, and "$\lceil\ \rceil$" denotes a ceiling function.

Preferably, the control information may be one of channel quality control information and a rank indication, and the channel quality control information may include at least one of Channel Quality Information (CQI) and a Precoding Matrix Indicator (PMI).

Preferably, the control information may be one of channel quality control information and a rank indication, and a payload size of the channel quality control information includes a size of Cyclic Redundancy Check (CRC) attached to the channel quality control information.

Preferably, the method may further include retrieving the payload size of the data of the first uplink signal and the total number of transmissible symbols of the Physical Uplink Shared Channel (PUSCH) of the first uplink signal from a memory or a cache.

Preferably, the number of symbols of control information may satisfy the expression:

$$Q' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=o}^{C-1} K_r} \right\rceil$$

where

Q' is the number of the symbols of the control information of the second uplink signal, O is the payload size of the control information of the second uplink signal, $N_{symb}^{PUSCH\text{-}initial}$ is a number of SC-FDMA symbols per subframe for Physical Uplink Shared Channel (PUSCH) transmission of the first uplink signal, $M_{sc}^{PUSCH\text{-}initial}$ is a scheduled bandwidth PUSCH transmission for Physical Uplink Shared Channel (PUSCH) transmission of the first uplink signal, $\beta_{offset}^{PUSCH}$ is the offset value, $$\sum_{r=0}^{C-1} K_r$$

is the payload size of the data of the first uplink signal, r is code block number of the data of the first uplink signal before channel coding of the data of the first uplink signal, $K_r$ is a number of bits in code block number r, and C is a total number of code blocks.

Also, there is a method and device for processing a received first and second uplink signal, each having data and control information. The method includes channel decoding channel encoded data with a payload size of the data of the first uplink signal and a total number of transmissible symbols of a PUSCH of the first uplink signal to produce the control information of the second uplink signal.

Preferably, the step of channel decoding may include channel decoding the channel encoded data with a payload size of the control information of the second uplink signal and an offset value applied to the control information of the second uplink signal.

Preferably, a number of symbols of control information decoded in the step of decoding satisfy the expression:

$$Q' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil$$

where

Q' is the number of the symbols of the control information of the second uplink signal, O is the payload size of the control information of the second uplink signal, $N_{symb}^{PUSCH\text{-}initial}$ is a number of SC-FDMA symbols per subframe for Physical Uplink Shared Channel (PUSCH) transmission of the first uplink signal, $M_{sc}^{PUSCH\text{-}initial}$ is a scheduled bandwidth PUSCH transmission for Physical Uplink Shared Channel (PUSCH) transmission of the first uplink signal, $\beta_{offset}^{PUSCH}$ is the offset value, $$\sum_{r=0}^{C-1} K_r$$

is the payload size of the data of the first uplink signal, r is code block number of the data of the first uplink signal before channel coding of the data of the first uplink signal, $K_r$ is a number of bits in code block number r, and C is a total number of code blocks.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

Figure 1:
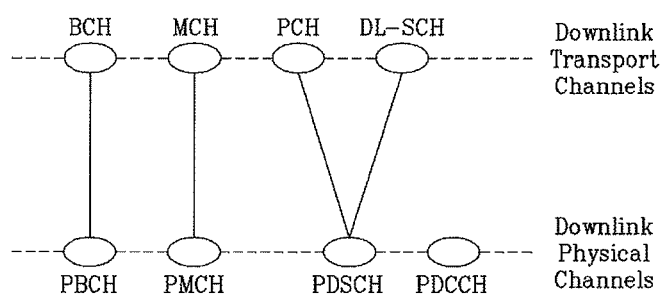
FIG. 1 illustrates a mapping relationship between a downlink physical channel and a downlink transport channel.
Figure 2:
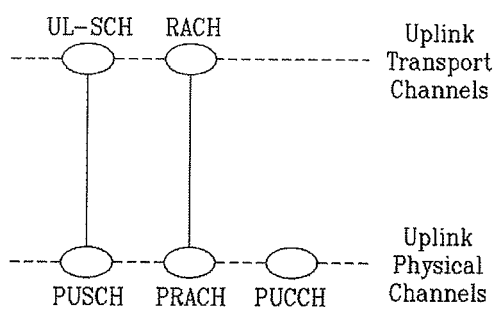
FIG. 2 illustrates a mapping relationship between an uplink physical channel and an uplink transport channel.
Figure 3:
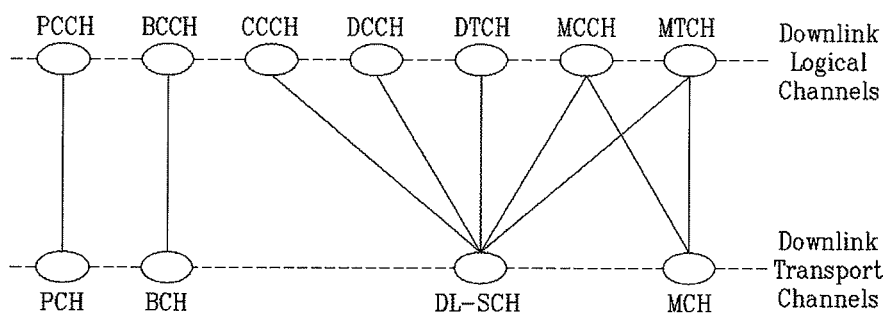
FIG. 3 illustrates a mapping relationship between a downlink transport channel and a downlink logical channel.
Figure 4:
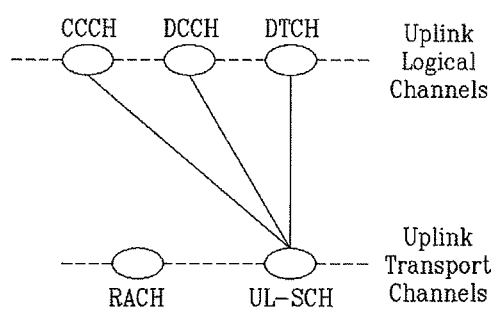
FIG. 4 illustrates a mapping relationship between an uplink transport channel and an uplink logical channel.
Figure 5:
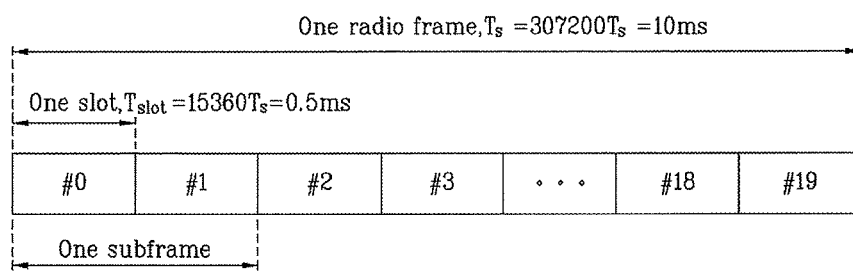
FIG. 5 is the radio frame structure type 1.
Figure 6:
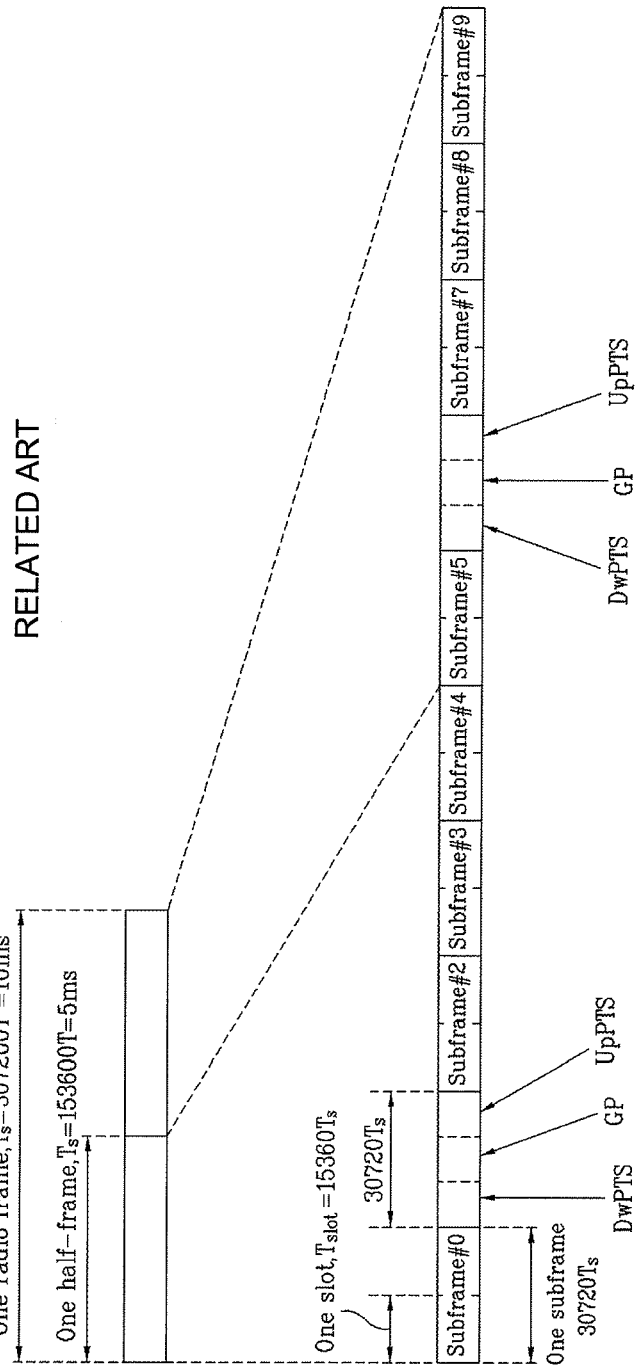
FIG. 6 is the radio frame structure type 2.
Figure 7:
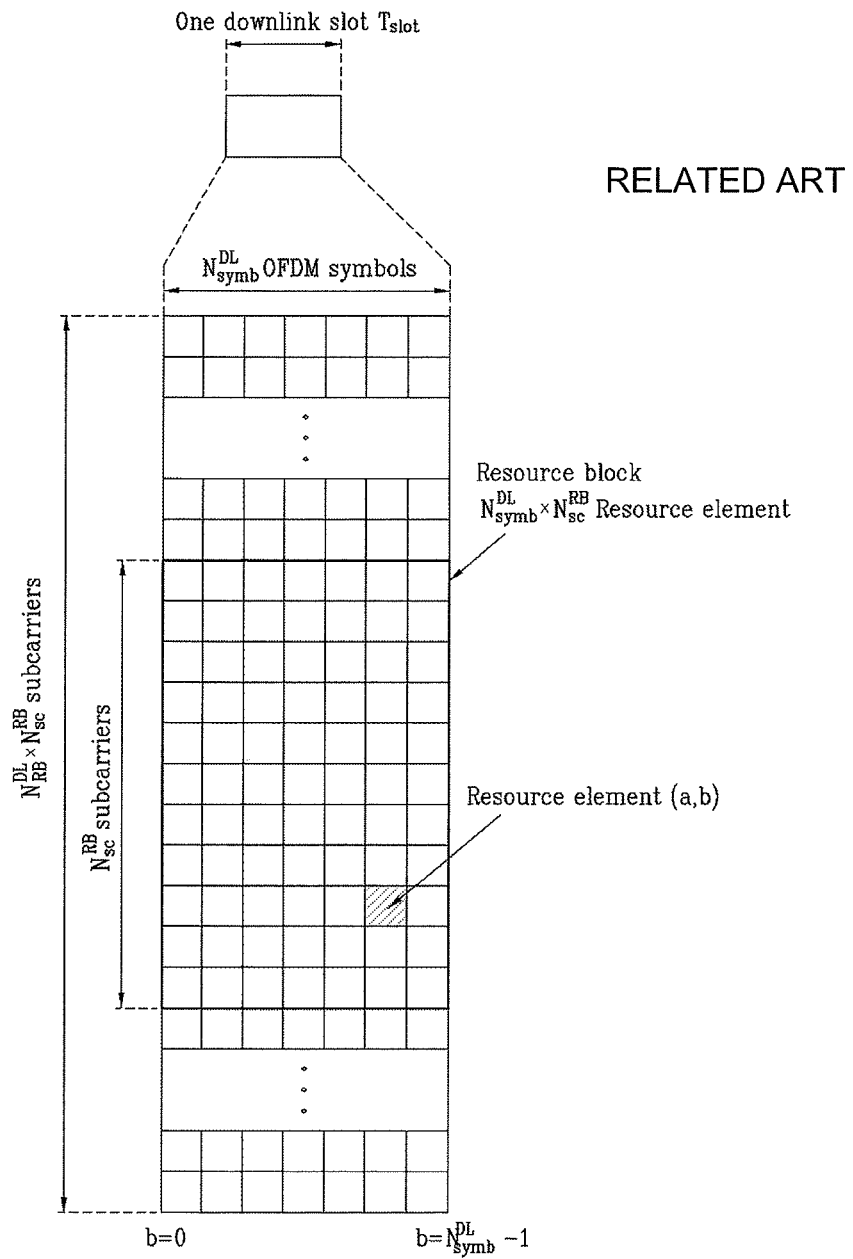
FIG. 7 is a downlink slot structure of LTE.
Figure 8:
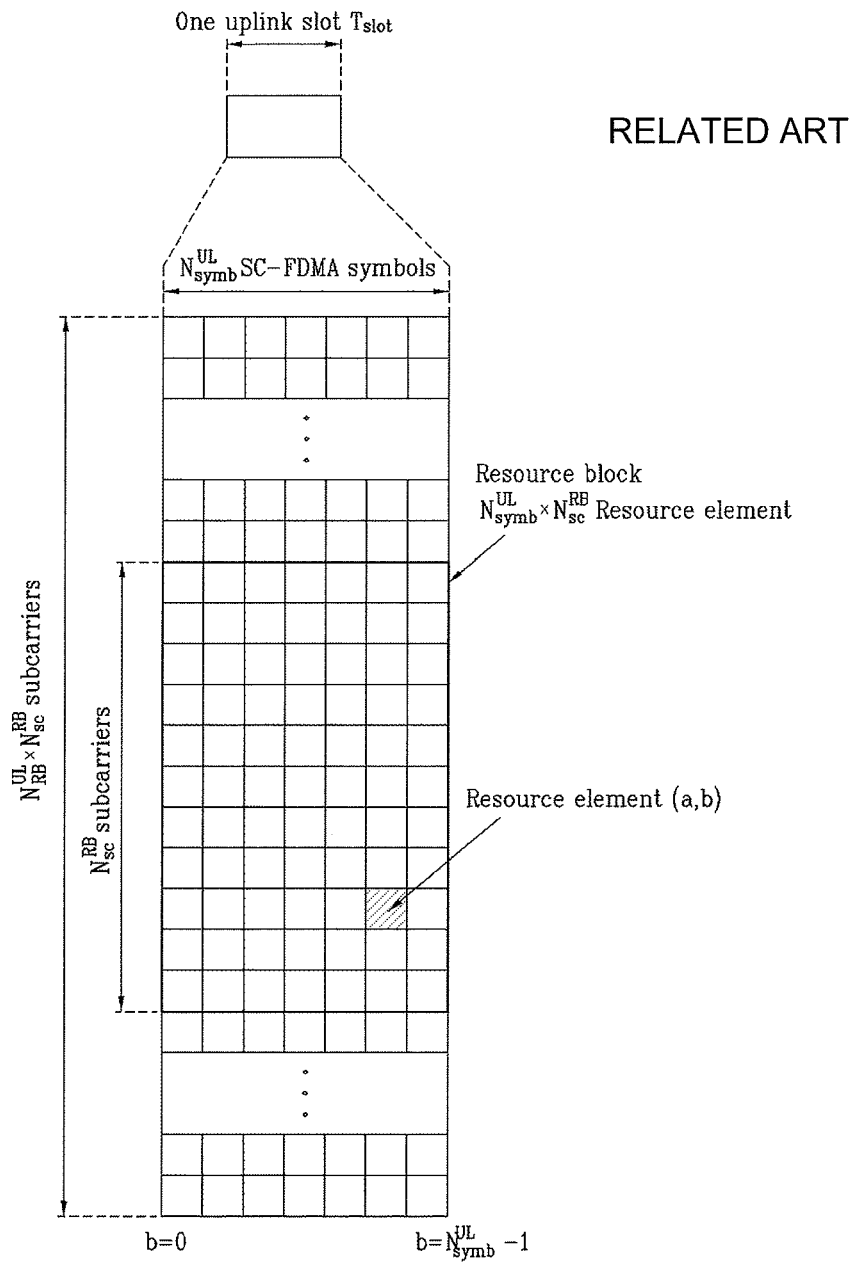
FIG. 8 is an uplink slot structure of LTE.
Figure 9A:
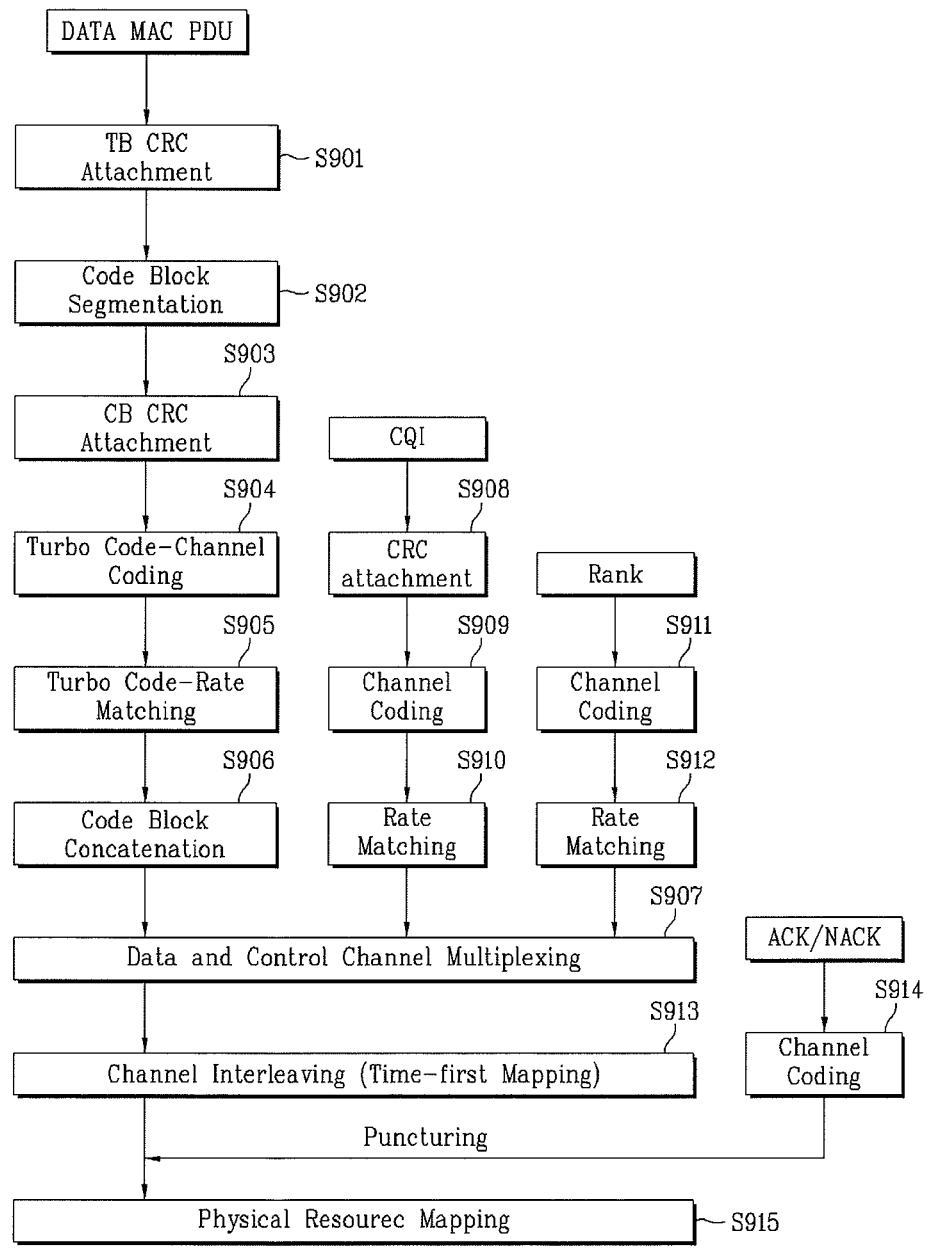
FIG. 9A illustrates a processing of data and control information transmitted through a UL-SCH which is an uplink transport channel.

FIG. 9A illustrates processing of data and control information transmitted through a UL-SCH which is an uplink transport channel.

A transport block (TB) CRC is attached to the TB of data transmitted to an uplink in step S901. The data is to be multiplexed with control information (CQI/PMI or rank indication). The CRC attached data is segmented into multiple code blocks (CBs) according to the size of the TB in step S902 and a CB CRC is attached to the CBs in step S903. Channel coding is performed upon the CRC-attached CBs in step S904. The channel coded data is rate-matched in step S905 and CBs are concatenated in step S906. The concatenated CBs are multiplexed with control information in step S907.

Meanwhile, a CRC is attached to CQI/PMI in step S908 and channel coding is performed upon the CRC-attached CQI/PMI in step S909. The channel-coded CQI/PMI is rate-matched in step S910 and multiplexed with the data in step S907. Although the channel coding process and the rate matching process are described as separate processes, the channel coding process may include the rate matching process in some cases.

Rank indication is channel-coded in step S911 separately from the data. The channel-coded rank indication is rate-matched in step S912. Although the channel coding process and the rate matching process are described as separate processes, the channel coding process may include the rate matching process in some cases.

A channel interleaving process is performed upon the multiplexed data, CQI/PMI, and rank indication in step S913.

Channel coding is performed upon acknowledgement (ACK)/negative acknowledgement (NACK) information in step S914 separately from the data, CQI/PMI, and rank indication.

The ACK/NACK information is inserted through puncturing a part of the channel-interleaved signal. The interleaved signal into which the ACK/NACK information is inserted is transmitted to the uplink after physical resource mapping in step S915.

The channel coded data, CQI/PMI, and rank indication of specific sizes are converted into data, CQI/PMI, and rank indication having prescribed numbers of symbols or bits transmitted in a physical layer through rate matching. In this case, the number of symbols or bits transmitted in the physical layer should be present with respect to each of the data, CQI/PMI, and rank indication.

Figure 9B:
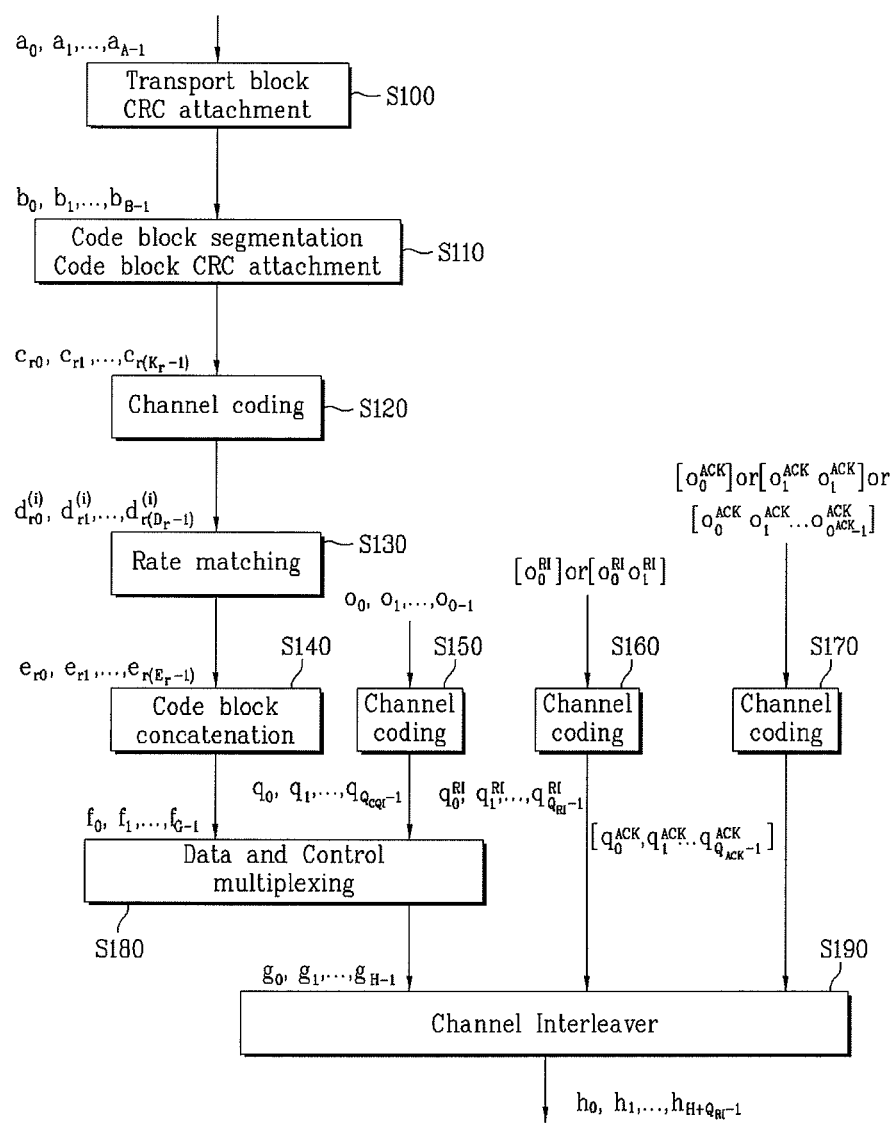
FIG. 9B illustrates an alternative processing of data and control information transmitted through a UL-SCH which is an uplink transport channel.

FIG. 9B illustrates an alternative processing of data and control information transmitted through a UL-SCH which is an uplink transport channel.

Error detection is provided on UL-SCH transport blocks through a Cyclic Redundancy Check (CRC) in step S100. The entire transport block is used to calculate the CRC parity bits. The bits in a transport block delivered to layer 1 are denoted by $a_0, a_1, a_2, a_3, \ldots, a_{A-1}$. The parity bits are denoted by $p_0, p_1, p_2, p_3, \ldots, p_{L-1}$. A is the size of the transport block and L is the number of parity bits.

Code block segmentation and code block CRC attachment are performed after transport block CRC attachment in step 110. The bits input to the code block segmentation are denoted by $b_0, b_1, b_2, b_3, \ldots, b_{B-1}$ where B is the number of bits in the transport block (including CRC). The bits after code block segmentation are denoted by $c_{r0}, c_{r1}, c_{r3}, \ldots, c_{r(K_r-1)}$, where r is the code block number and $K_r$ is the number of bits for code block number r.

Channel coding is performed after code block segmentation and code block CRC in step 120. After encoding the bits are denoted by $d_{r0}^{(i)}, d_{r1}^{(i)}, d_{r2}^{(i)}, d_{r3}^{(i)}, \ldots, d_{r(D_r-1)}^{(i)}$, with i=0, 1, and 2 and where $D_r$ is the number of bits on the i-th coded stream for code block number r, i.e. $D_r = K_r + 4$.

Rate matching is performed on Turbo coded blocks after channel coding in step 130. After rate matching, the bits are denoted by $e_{r0}, e_{r1}, e_{r2}, e_{r3}, \ldots, e_{r(E_r-1)}$, where r is the coded block number, and where E is the number of rate matched bits for code block number r.

Code block concatenation is performed after rate matching in step 140. The bits after code block concatenation are denoted by $f_0, f_1, f_2, f_3, \ldots, f_{G-1}$, where G is the total number of coded bits for transmission excluding the bits used for control transmission, when control information is multiplexed with the UL-SCH transmission.

The channel coding of the channel quality information is performed with input sequence $o_0, o_1, o_2, \ldots, o_{O-1}$, in step 150. The output sequence for the channel coding of channel quality information is denoted by $q_0, q_1, q_2, \ldots, q_{Q_{CQI}-1}$.

The channel coding of the RI is preformed with input sequence $[o_0^{RI}]$ or $[o_0^{RI} o_1^{RI}]$ in step 160. $[o_0^{RI}]$ and $[o_0^{RI} o_1^{RI}]$ denotes 1-bit RI and denotes 2-bits RI, respectively.

The channel coding of the HARQ-ACK is performed with input sequence $[o_0^{ACK}]$ $[o_0^{ACK} o_1^{ACK}]$ or $[o_0^{ACK} o_1^{ACK} \ldots o_{O_{ACK}-1}^{ACK}]$ in step 170. Each positive acknowledgement (ACK) encoded as a binary '1' and each negative acknowledgement (NAK) is encoded as a binary '0'. HARQ-ACK can consist of 1-bit of information, i.e., $[o_0^{ACK}]$ or 2-bits of information, i.e., $[o_0^{ACK} o_1^{ACK}]$ with $o_0^{ACK}$ corresponding to ACK/NACK bit for codeword 0 and $o_1^{ACK}$ corresponding to that for codeword 1. In addition, HARQ-ACK can consist of more than two bits information, i.e. $[o_0^{ACK} o_1^{ACK} \ldots o_{O^{ACK}-1}^{ACK}]$ with $O^{ACK} > 2$. The bit sequence $q_0^{ACK}, q_1^{ACK}, q_{Q^{ACK}-1}^{ACK}$ is obtained by concatenation of multiple encoded HARQ-ACK blocks where $Q_{ACK}$ is the total number of coded bits for all the encoded HARQ-ACK blocks.

The inputs to the data and control multiplexing are the coded bits of the control information denoted by $q_0, q_1, q_2, q_3, \ldots, q_{Q_{CQI}-1}$ and the coded bits of the UL-SCH denoted by $f_0, f_1, f_2, f_3, \ldots, f_{G-1}$ in step 180. The output of the data and control multiplexing operation is denoted by $g_0, g_1, g_2, g_3, \ldots, g_{H'-1}$, where $H=(G+Q_{CQI})$ and $H'=H/Q_m$, and where $g_i$ with i=0, ..., H'−1 are column vectors of length $Q_m$. H is the total number of coded bits allocated for UL-SCH data and CQI/PMI information.

The channel interleaving is performed with the output of the data and control multiplexing operation denoted by $g_0, g_1, g_2, g_3, \ldots, g_{H'-1}$, the encoded rank indication denoted by the $q_0, q_1, q_2, q_3, \ldots, q_{Q_{CQI}-1}$ and the encoded HARQ-ACK denoted by $q_0^{ACK}, q_1^{ACK}, q_2^{ACK}, \ldots, q_{Q^{ACK}-1}^{ACK}$.

The bits after channel interleaving are denoted by $h_0, h_1, h_2, \ldots, h_{H+Q_{RI}-1}$. The number of modulation symbols in the subframe is given by $H''=H'+Q'_{RI}$.

Figure 10:
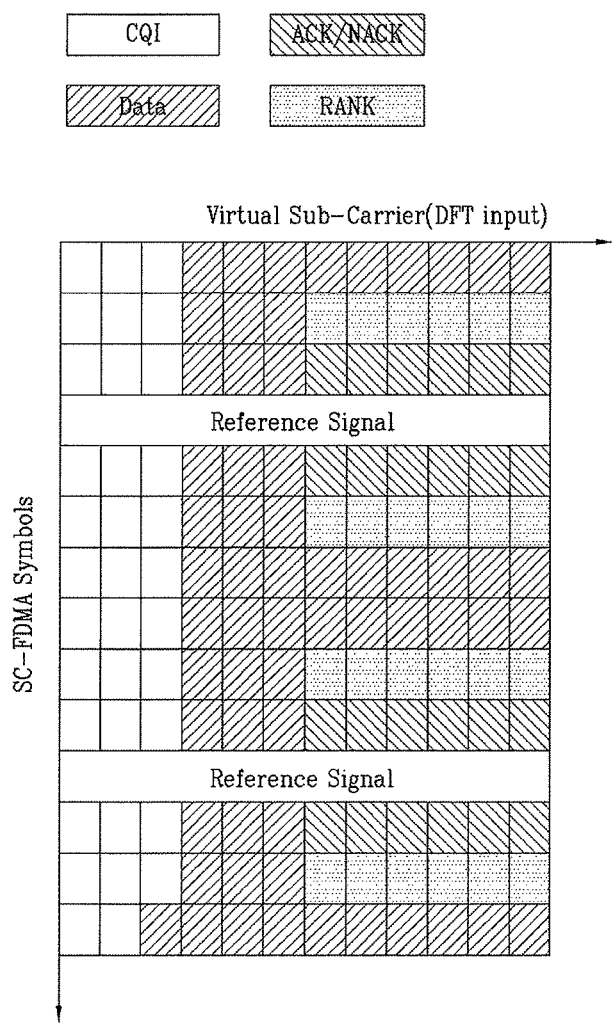
FIG. 10 is a subframe structure after data and control information are multiplexed.

FIG. 10 illustrates a subframe structure after data and control information are multiplexed. The subframe after data, CQI/PMI, rank indication, and ACK/NACK information are appropriately multiplexed in a physical layer is as shown in FIG. 10.

Hereinafter, a method will be described for calculating code rates of data and control information when data is transmitted through an UL-SCH.

When data is simultaneously transmitted together with other information (e.g., at least one of CQI/PMI information and rank indication), since such control information transmitted together with the data is multiplexed together with the data after rate matching, the number of transmitted symbols of the data and the number of transmitted symbols of the control information transmitted together with the data are needed upon transmission of the data. Herein, "the number of transmitted symbols" means the number of symbols output through rate matching. Therefore, in the present invention, "the number of transmitted symbols" is referred to as the number of symbols output through rate matching.

In addition, in the present invention, a payload size may be defined as the sum of the size of information (e.g., the size of data, or the size of control information) transmitted from a medium access control (MAC) layer and the size of cyclic redundancy check (CRC) attached arbitrarily to the information in a physical layer. The payload of the control information may not include the size of the CRC because the CRC may not be attached to the control information according to the size of the control information before the CRC is attached to the control information. Specifically, if the size of the control information to which the CRC is not attached is smaller than or equal to 11 bits, the CRC is not attached to the control information. In addition, if the size of the control information to which the CRC is not attached is greater than or equal to 12 bits, the CRC is attached to the control information.

If a code rate and a modulation order of the transmitted data are accurately known, a reference modulation and coding scheme (MCS) may be defined using the code rate and modulation order of the data. An MCS of the control information transmitted together with the data may be estimated using the reference MCS and using offset information of the control information.

Assuming that the inverse of spectral efficiency obtained by a code rate and a modulation order of data is $MCS_{data}$, $MCS_{data}$ may be calculated using the following Equation 1.

$$MCS_{data} = \frac{1}{CodeRate \cdot \text{Modulation Order}} \quad \text{[Equation 1]}$$

If a reference MCS is $MCS_{ref}$, a payload size of CQI/PMI is $N_{CQI}$, and a parameter expressing, in dB, an offset value for compensating for a difference between a block error rate of data and a block error rate of CQI/PMI and a difference between a data encoding scheme and a CQI/PMI encoding scheme is $\Delta_{CQI}$, the number $M_{CQI}$ of transmitted symbols of CQI/PMI may be calculated using the following Equation 2.

$$M_{CQI} = \left\lceil N_{CQI} \cdot 10^{\frac{\Delta_{CQI}}{10}} \cdot MCS_{ref} \right\rceil \quad \text{[Equation 2]}$$

In Equation 2, "⌈ ⌉" denotes a ceiling function. The ceiling function represents a function whose value is the smallest integer not less than a value within the symbol. For example, ⌈2.3⌉ indicates 3 because the smallest integer not less than 2.3 is 3.

In addition, if reference MCS is $MCS_{ref}$, a payload size of rank indication is $N_{RI}$, and a parameter expressing, in dB, an offset value for compensating for a difference between a block error rate of data and a block error rate of rank indication and a difference between a data encoding scheme and a rank indication encoding scheme is $\Delta_{RI}$, the number $M_{RI}$ of transmitted symbols of rank indication may be expressed by the following Equation 3.

$$M_{RI} = \left\lceil N_{RI} \cdot 10^{\frac{\Delta_{RI}}{10}} \cdot MCS_{ref} \right\rceil \quad \text{[Equation 3]}$$

If a code rate and modulation order of data used when calculating a reference MCS are known, the number of transmitted symbols of CQI/PMI and the number of transmitted symbols of rank indication may be calculated. However, if an eNB commands transmission of data on an UL-SCH, the eNB informs a UE of only the total number of symbols which can be transmitted when the data and other information are multiplexed, a payload size of the data, and the modulation order of the data. Therefore, agreement between the eNB and the UE is required to calculate the reference MCS.

Embodiment 1-A

As illustrated in FIG. 9A, when the data, CQI/PMI, and rank indication are transmitted together, the data, CQI/PMI, and rank indication are rate-matched and then multiplexed. To calculate the number of transmitted symbols of each of the data, CQI/PMI, and rank indication, equations of a complicated closed form or iterative equations should be used.

Accordingly, a method for briefly calculating the reference MCS is proposed. However, if the method for calculating the reference MCS is simplified, an accurate code rate of the information may not be applied.

The method for calculating the reference MCS uses the code rate and modulation order of data under the assumption that only the data is transmitted on the UL-SCH without transmitting the CQI/PMI or rank indication.

Specifically, a reference code rate may be calculated using the following Equation 4.

$$CR_{data} = \frac{N_{data}}{Q_{data} \cdot M_{RE}^{PUSCH}} \quad \text{[Equation 4]}$$

where $CR_{data}$ denotes a reference code rate, $N_{data}$ denotes a payload size of data, $Q_{data}$ denotes a modulation order of data which is a reference modulation order, and $M_{RE}^{PUSCH}$ is the total number of symbols which can be transmitted through a physical channel when transmitting data through the UL-SCH. In the present invention, the $M_{RE}^{PUSCH}$ is correspond to $M_{sc}^{PUSCH} \cdot N_{symb}^{PUSCH\text{-}initial}$ where the $M_{sc}^{PUSCH}$ is the scheduled bandwidth for PUSCH transmission in a current sub-frame for the transport block, and $N_{symb}^{PUSCH}$ is the number of SC-FDMA symbols in the current PUSCH transmission sub-frame.

Therefore, the reference MCS $MCS_{ref}$ may be calculated using the following Equation 5.

$$MCS_{ref} = \frac{1}{CR_{data} \cdot Q_{data}} = \frac{M_{RE}^{PUSCH}}{N_{data}} \quad \text{[Equation 5]}$$

where $CR_{data}$ denotes a reference code rate, $N_{data}$ denotes a payload size of data, $Q_{data}$ denotes a modulation order of data which is a reference modulation order, and $M_{RE}^{PUSCH}$ denotes the total number of symbols which can be transmitted through a physical channel when transmitting data through the UL-SCH.

Generally, a CRC is attached to data to check for errors. In Equation 4 and Equation 5, the payload size $N_{data}$ of data is defined as a value including the CRC but may not include the CRC for simple approximation.

Application of Embodiment 1-A

In the Case where Data and CQI/PMI are Transmitted Together

When data and CQI/PMI are transmitted on the UL-SCH, the reference MCS is calculated using the payload size $N_{data}$ of data. The number of finally transmitted symbols of the CQI/PMI may be calculated using the following Equation 6.

$$M_{CQI} = \left\lceil N_{CQI} \cdot 10^{\frac{\Delta_{CQI}}{10}} \cdot MCS_{ref} \right\rceil \quad \text{[Equation 6]}$$

where $N_{CQI}$ denotes a payload size of CQI/PMI, and $\Delta_{CQI}$ denotes a parameter expressing, in dB, an offset value for compensating for a difference between the block error rate of data and the block error rate of CQI/PMI and a difference between a data encoding scheme and a CQI/PMI encoding scheme, and $M_{CQI}$ denotes the number of transmitted symbols of CQI/PMI after rate matching.

If the number $M_{CQI}$ of transmitted symbols of the CQI/PMI is obtained using Equation 6, the number $M_{data}$ of transmitted symbols of data may be calculated using the following Equation 7.

$$M_{data} = M_{RE}^{PUSCH} - M_{CQI} \qquad \text{[Equation 7]}$$

where $M_{RE}^{PUSCH}$ denotes the total number of symbols which can be transmitted through a physical channel when transmitting data on a UL-SCH. Since the data and CQI/PMI are multiplexed after they are rate-matched, the number of symbols obtained by subtracting $M_{CQI}$ from $M_{RE}^{PUSCH}$ is the number $M_{data}$ of symbols of data.

Application of Embodiment 1-A

In the Case where Data and Rank Indication are Transmitted Together

When data and rank indication are transmitted on the UL-SCH, the number $M_{RI}$ of transmitted symbols of the rank indication may be calculated using the following Equation 8, similarly to when the data and CQI/PMI are transmitted.

$$M_{RI} = \left\lceil N_{RI} \cdot 10^{\frac{\Delta_{RI}}{10}} \cdot MCS_{ref} \right\rceil \qquad \text{[Equation 8]}$$

where $N_R$, denotes a payload size of rank indication, and $\Delta_{RI}$ denotes a parameter expressing, in dB, an offset value for compensating for a difference between the block error rate of data and the block error rate of rank indication and a difference between a data encoding scheme and a rank indication encoding scheme, and $M_{RI}$ denotes the number of transmitted symbols of rank indication.

Once $M_{RI}$ is obtained using Equation 8, the number $M_{data}$ of transmitted symbols of data may be calculated using the following Equation 9.

$$M_{data} = M_{RE}^{PUSCH} - M_{RI} \qquad \text{[Equation 9]}$$

where $M_{RE}^{PUSCH}$ denotes the total number of symbols which can be transmitted through a physical channel when transmitting data on a UL-SCH. Since the data and rank indication are multiplexed after they are rate-matched, the number of symbols obtained by subtracting $M_{RI}$ from $M_{RE}^{PUSCH}$ is the number $M_{data}$ of symbols of the data.

Application of Embodiment 1-A

In the Case where Data, CQI/PMI, and Rank Indication are Transmitted Together

When the data, CQI/PMI, and rank indication are transmitted together, the number $M_{CQI}$ of transmitted symbols of CQI/PMI and the number $M_{RI}$ of transmitted symbols of rank indication are calculated using the reference MCS as follows.

$$M_{CQI} = \left\lceil N_{CQI} \cdot 10^{\frac{\Delta_{CQI}}{10}} \cdot MCS_{ref} \right\rceil \qquad \text{[Equation 10]}$$

$$M_{RI} = \left\lceil N_{RI} \cdot 10^{\frac{\Delta_{RI}}{10}} \cdot MCS_{ref} \right\rceil \qquad \text{[Equation 11]}$$

If $M_{CQI}$ and $M_{RI}$ are obtained, $M_{data}$ is calculated using $M_{RE}^{PUSCH}$ as follows.

$$M_{data} = M_{RE}^{PUSCH} - M_{CQI} - M_{RI} \qquad \text{[Equation 12]}$$

For accurate decoding of data, CQI/PMI, and rank indication between a UE and an eNB, the above-mentioned calculations should be accurately carried out. However, since the above equations include $$10^{\frac{\Delta_{CQI}}{10}}, 10^{\frac{\Delta_{RI}}{10}},$$

etc., irrational number values may be calculated. Therefore, a calculation result in the UE and the eNB may vary according to calculation methods of multiplication, division, and $$10^{\frac{\Delta_{CQI}}{10}} \text{ and } 10^{\frac{\Delta_{RI}}{10}}$$

in the UE and eNB.

A method is proposed for calculating the numbers of transmitted symbols of CQI/PMI and rank indication such that a calculation result of division does not generate a remainder.

The numbers of transmitted symbols of the CQI/PMI and rank indication are calculated using the following Equation 13.

$$M_X = \left\lceil N_X \cdot 10^{\frac{\Delta_X}{10}} \cdot MCS_{ref} \right\rceil \qquad \text{[Equation 13]}$$

where $N_X$ denotes a payload size of information X, $\Delta_X$ denotes a parameter expressing, in dB, an offset value for compensating for a difference between the block error rate of data and the block error rate of the information X and a difference between a data decoding scheme and an information X decoding scheme, and $M_X$ denotes the number of transmitted symbols of information X.

In Equation 13, $$10^{\frac{\Delta_X}{10}},$$

and $MCS_{ref}$ defined in Equation 5 may be differently calculated in the UE and the eNB. The UE and eNB may promise to previously define $$10^{\frac{\Delta_X}{10}}$$

as a quantized value.

Table 1 listed below shows a result of quantizing $$10^{\frac{\Delta_X}{10}}.$$

For example, the UE and the eNB may define $$10^{\frac{\Delta_X}{10}}$$

as a quantized value as shown in Table 1. In Table 1, $$\beta_X\left(=quan\left(10^{\frac{\Delta_X}{10}}\right)\right)$$

indicates a value of quantizing $$10^{\frac{\Delta_X}{10}}.$$

A fractional part of $$10^{\frac{\Delta_X}{10}}.$$

may be expressed by N bits. In Table 1, a quantized result of $\beta_X$ is shown such that a fractional part thereof can be expressed by 6 bits.

TABLE 1

| Index | $\Delta_X$ | $\beta_X = quan\left(10^{\frac{\Delta_X}{10}}\right)$ |
|---|---|---|
| 0 (000) | 0 dB | 1.0000000000 |
| 1 (001) | 1 dB | 1.2500000000 |
| 2 (010) | 2 dB | 1.5781250000 |
| 3 (011) | 3 dB | 1.9843750000 |
| ... | ... | 2.5000000000 |
| 7 (111) | 7 dB | 3.1562500000 |

Table 2 and 3 listed below show a result of calculating $\beta_X$ when the information X is CQI/PMI or rank indication.

TABLE 2

| Index | $\beta_{RI}$ |
|---|---|
| 0 | 1.250 |
| 1 | 1.625 |
| 2 | 2.000 |
| 3 | 2.500 |
| 4 | 3.125 |
| 5 | 4.000 |
| 6 | 5.000 |
| 7 | 6.250 |
| 8 | 8.000 |
| 9 | 10.000 |
| 10 | 12.625 |
| 11 | 15.875 |
| 12 | 20.000 |
| 13 | reserved |
| 14 | reserved |
| 15 | reserved |

TABLE 3

| Index | $\beta_{CQI}$ |
|---|---|
| 0 | 0.750 |
| 1 | 1.000 |

TABLE 3-continued

| Index | $\beta_{CQI}$ |
|---|---|
| 2 | 1.125 |
| 3 | 1.250 |
| 4 | 1.375 |
| 5 | 1.625 |
| 6 | 1.750 |
| 7 | 2.000 |
| 8 | 2.250 |
| 9 | 2.500 |
| 10 | 2.875 |
| 11 | 3.125 |
| 12 | 3.500 |
| 13 | 4.000 |
| 14 | 5.000 |
| 15 | 6.250 |

Since $MCS_{ref}$ may have various values, the UE and eNB should store large quantities of values in order to define $MCS_{ref}$ as a quantized value between the UE and the eNB. However, in order not to store the quantized value, division which may generate a non-integer calculation result should be eliminated.

Using Equation 13 and Equation 5, the number $M_X$ of transmitted symbols of information X can be as follows.

$$M_X = \left\lceil N_X \cdot 10^{\frac{\Delta_X}{10}} \cdot MCS_{ref} \right\rceil = \left\lceil N_X \cdot 10^{\frac{\Delta_X}{10}} \cdot \frac{M_{RE}^{PUSCH}}{N_{data}} \right\rceil \quad \text{[Equation 14]}$$

In Equation 14, a denominator of $MCS_{ref}$ may be transposed towards $M_X$. When transposing values within a ceiling function, equality ("=") may be converted to inequality ("≥"). Namely, in the ceiling function, $$Z = \left\lceil \frac{Y}{X} \right\rceil$$

can be expressed as $Z \cdot X \geq Y$ on condition that Z is the smallest integer satisfying $Z \cdot X \geq Y$.

Thus, an equation for calculating the number of transmitted symbols of information X transmitted through a physical channel to solve a quantization problem may be defined as follows.

$$M_X \cdot N_{data} \geq N_X \cdot \beta_X \cdot M_{RE}^{PUSCH} \quad \text{[Equation 15]}$$

where $M_{RE}^{PUSCH}$ denotes the total number of symbols which can be transmitted through a physical channel when transmitting data through a UL-SCH, $N_{data}$ denotes a payload size of data, $N_X$ denotes the payload size of the information X, $M_X$ denotes the number of transmitted symbols of the information X and $\beta_X$ denotes a value of quantizing $$10^{\frac{\Delta_X}{10}}.$$

When $N_{data}$, $N_X$, $\beta_X$, and $M_{RE}^{PUSCH}$ are given, $M_X$ becomes the smallest integer satisfying Equation 15.

In addition, since $\beta_X$ is greater than 1, the inverse of $\beta_X$, that is, $\beta'_X = 1/\beta_X$ may be used in Equation 15. The reason why $\beta'_X$ is used is that when storing $\beta_X$, an integer part and a fractional part should be stored but when memorizing $\beta'_X$, only the fractional part can be stored. Accordingly, Equation 15 for calculating the number of transmitted symbols of the information X through a physical channel to solve the quantization problem may be defined as follows.

$$M_X \beta'_X N_{data} \geq N_X M_{RE}^{PUSCH}$$ [Equation 16]

When $N_{data}$, $N_X$, $\beta'_X$, and $M_{RE}^{PUSCH}$ are given, $M_X$ is the smallest integer satisfying Equation 16.

In Embodiment 1-A, the reference MCS is calculated using a code rate and a modulation order of data under the assumption that only the data is transmitted on a UL-SCH without transmitting CQI/PMI or rank indication. Therefore, the reference MCS may not be an accurate value.

Namely, in Embodiment 1-A, an accurate code rate may not be applied to information (i.e., data, CQI/PMI and rank indication). Assuming that the reference code rate is a code rate of data, the code rate of data can be determined only when an occupied ratio of CQI/PMI and rank indication among the entire amount of information should be determined. The occupied ratio of CQI/PMI and rank indication among the entire amount can be known only when the code rate of data should be determined.

Embodiment 1-B

In Embodiment 1-B of the present invention, a method is proposed for simultaneously calculating reference code rates of data, CQI/PMI and rank indication in a closed form using the fact that the total number of transmitted symbols is the sum of the numbers of transmitted symbols of the data, CQI/PMI and rank indication on a UL-SCH. Specifically, assuming that a reference MCS is an unknown parameter and the numbers of transmitted symbols of CQI/PMI and rank indication are expressed as a function of the reference MCS, since the total number of transmitted symbols of the data, CQI/PMI and rank indication is known, an accurate reference MCS can be obtained.

Application of Embodiment 1-B

In the Case where Data and CQI/PMI are Transmitted Together

When only data and CQI/PMI are transmitted, the total number of transmitted symbols may be indicated by the sum of the number of transmitted symbols of the CQI/PMI and the number of transmitted symbols of the data. Accordingly, a reference MCS is calculated using the equation for calculating the number of transmitted symbols of the CQI/PMI and the equation for calculating the number of transmitted symbols of the data. Next, the number of transmitted symbols of the data is calculated using the calculated reference MCS and the number of transmitted symbols of the CQI/PMI are calculated.

More specifically, the number of transmitted symbols of the data is calculated using the following Equation 17. In this case, the number of transmitted symbols of the CQI/PMI is expressed by a function of the number of transmitted symbols of the data and a closed-form equation is obtained as shown in the following Equation 18.

$$M_{RE}^{PUSCH} = M_{CQI} + M_{data}$$ [Equation 17]
$$= \left\lceil N_{CQI} \cdot 10^{\frac{\Delta_{CQI}}{10}} \cdot MCS_{ref} \right\rceil + \lceil N_{data} \cdot MCS_{ref} \rceil$$
$$= \left\lceil N_{CQI} \cdot 10^{\frac{\Delta_{CQI}}{10}} \cdot \frac{M_{data}}{N_{data}} \right\rceil + \left\lceil N_{data} \cdot \frac{M_{data}}{N_{data}} \right\rceil$$

-continued $$M_{RE}^{PUSCH} = \left\lceil N_{CQI} \cdot 10^{\frac{\Delta_{CQI}}{10}} \cdot \frac{M_{data}}{N_{data}} \right\rceil + M_{data}$$ [Equation 18]

In Equation 17 and Equation 18, $N_{data}$ denotes a payload size of data, $M_{data}$ denotes the number of transmitted symbols of the date, $M_{RE}^{PUSCH}$ denotes the total number of symbols which can be transmitted through a physical channel, $MCS_{ref}$ denotes a reference MCS, $N_{CQI}$ denotes a payload size of CQI/PMI, $\Delta_{CQI}$ denotes a parameter expressing, in dB, an offset value for compensating for a difference between a block error rate of data and a block error rate of CQI/PMI and a difference between a data encoding scheme and a CQI/PMI encoding scheme, and $M_{CQI}$ denotes the number of transmitted symbols of CQI/PMI.

Meanwhile, to solve a quantization problem, Equation 18 may be replaced with the following Equation 19.

$$(M_{RE}^{PUSCH} - M_{data}) \cdot N_{data} \geq N_{CQI} \beta_{CQI} M_{data}$$ [Equation 19]

where $\beta_{CQI}$ denotes a value obtained by quantizing $$10^{\frac{\Delta_{CQI}}{10}}.$$

When $N_{data}$, $N_{CQI}$, $\beta_{CQI}$, and $M_{RE}^{PUSCH}$ are given, $M_{data}$ is the smallest integer satisfying Equation 19.

If $M_{data}$ is obtained using Equation 19, $M_{CQI}$ may be calculated using the following Equation 20.

$$M_{CQI} = M_{RE}^{PUSCH} - M_{data}$$ [Equation 20]

Application of Embodiment 1-B

In the Case where Data and Rank Indication are Transmitted Together

When only data and rank indication are transmitted a UL-SCH, the number of transmitted symbols of the rank indication is calculated similarly to the case where only the data and CQI/PMI are transmitted. A reference MCS is calculated using the equation for calculating the number of transmitted symbols of the rank indication and the equation for calculating the number of transmitted symbols of the data. The number of transmitted symbols of the data is calculated using the calculated reference MCS and the number of transmitted symbols of the rank indication is calculated.

More specifically, the number of transmitted symbols of the data is calculated using the following Equation 21. In this case, the number of transmitted symbols of the rank indication is expressed by a function of the number of transmitted symbols of the data and a closed-form equation is obtained as shown in the following Equation 22.

$$M_{RE}^{PUSCH} = M_{RI} + M_{data}$$ [Equation 21]
$$= \left\lceil N_{RI} \cdot 10^{\frac{\Delta_{RI}}{10}} \cdot MCS_{ref} \right\rceil + \lceil N_{data} \cdot MCS_{ref} \rceil$$
$$= \left\lceil N_{RI} \cdot 10^{\frac{\Delta_{RI}}{10}} \cdot \frac{M_{data}}{N_{data}} \right\rceil +$$
$$\left\lceil N_{data} \cdot \frac{M_{data}}{N_{data}} \right\rceil$$

-continued $$M_{RE}^{PUSCH} = \left\lceil N_{RI} \cdot 10^{\frac{\Delta_{RI}}{10}} \cdot \frac{M_{data}}{N_{data}} \right\rceil + M_{data} \qquad \text{[Equation 22]}$$

In Equation 21 and Equation 22, $N_{data}$ denotes a payload size of data, $M_{data}$ denotes the number of transmitted symbols of the date, $M_{RE}^{PUSCH}$ denotes the total number of symbols which can be transmitted through a physical channel, $MCS_{ref}$ denotes a reference MCS, $N_{RI}$ denotes a payload size of rank indication, $\Delta_{RI}$ denotes a parameter expressing, in dB, an offset value for compensating for a difference between a block error rate of data and a block error rate of rank indication and a difference between a data encoding scheme and a rank indication encoding scheme, and $M_{RI}$ denotes the number of transmitted symbols of rank indication.

Meanwhile, to solve a quantization problem, Equation 22 may be replaced with the following Equation 23.

$$(M_{RE}^{PUSCH} - M_{data}) \cdot N_{data} \geq N_{RI} \cdot \beta_{RI} \cdot M_{data} \qquad \text{[Equation 23]}$$

where $\beta_{RI}$ denotes a value obtained by quantizing $$10^{\frac{\Delta_{RI}}{10}}.$$

When $N_{data}$, $N_{RI}$, $\beta_{RI}$, and $M_{RE}^{PUSCH}$ are given, $M_{data}$ is the smallest integer satisfying Equation 23.

If $M_{data}$ is obtained using Equation 23, $M_{RI}$ may be calculated using the following Equation 24.

$$M_{RI} = M_{RE}^{PUSCH} - M_{data} \qquad \text{[Equation 24]}$$

Application of Embodiment 1-B

In the Case where Data, CQI/PMI, and Rank Indication are Transmitted Together

When data, CQI/PMI, and rank indication are transmitted, the total number of transmitted symbols on a UL-SCH may be indicated by the sum of the number of transmitted symbols of the CQI/PMI, the number of transmitted symbols of the rank indication, and the number of transmitted symbols of the data. Therefore, a reference MCS may be calculated using the equation for calculating the number of transmitted symbols of the CQI/PMI, the equation for calculating the number of transmitted symbols of the rank indication, and the equation for calculating the number of transmitted symbols of the data. The number of transmitted symbols of the data may be calculated using the calculated reference MCS and the numbers of transmitted symbols of the CQI/PMI and the rank indication may be calculated.

More specifically, the number of transmitted symbols of the data is calculated using the following Equation 25. In this case, the numbers of transmitted symbols of the CQI/PMI and the rank indication are expressed by a function of the number of transmitted symbols of the data and a closed-form equation is obtained as shown in the following Equation 26.

$$M_{RE}^{PUSCH} = M_{CQI} + M_{RI} + M_{data} \qquad \text{[Equation 25]}$$

$$= \left\lceil N_{CQI} \cdot 10^{\frac{\Delta_{CQI}}{10}} \cdot MCS_{ref} \right\rceil +$$

$$\left\lceil N_{RI} \cdot 10^{\frac{\Delta_{RI}}{10}} \cdot MCS_{ref} \right\rceil + \lceil N_{data} \cdot MCS_{ref} \rceil$$

$$= \left\lceil N_{CQI} \cdot 10^{\frac{\Delta_{CQI}}{10}} \cdot \frac{M_{data}}{N_{data}} \right\rceil +$$

$$\left\lceil N_{RI} \cdot 10^{\frac{\Delta_{RI}}{10}} \cdot \frac{M_{data}}{N_{data}} \right\rceil + \left\lceil N_{data} \cdot \frac{M_{data}}{N_{data}} \right\rceil$$

$$M_{RE}^{PUSCH} = \qquad \text{[Equation 26]}$$

$$\left\lceil N_{CQI} \cdot 10^{\frac{\Delta_{CQI}}{10}} \cdot \frac{M_{data}}{N_{data}} \right\rceil + \left\lceil N_{RI} \cdot 10^{\frac{\Delta_{RI}}{10}} \cdot \frac{M_{data}}{N_{data}} \right\rceil + M_{data}$$

In Equation 25 and Equation 26, $N_{data}$ denotes a payload size of data, $M_{data}$ denotes the number of transmitted symbols of the date, $M_{RE}^{PUSCH}$ denotes the total number of symbols which can be transmitted through a physical channel, $MCS_{ref}$ denotes a reference MCS, $N_{CQI}$ denotes a payload size of CQI/PMI, $\Delta_{CQI}$ denotes a parameter expressing, in dB, an offset value for compensating for a difference between a block error rate of data and a block error rate of CQI/PMI and a difference between a data encoding scheme and a CQI/PMI encoding scheme, $M_{CQI}$ denotes the number of transmitted symbols of CQI/PMI, $N_{RI}$ denotes a payload size of rank indication, $\Delta_{RI}$ denotes a parameter expressing, in dB, an offset value for compensating for a difference between a block error rate of data and a block error rate of rank indication and a difference between a data encoding scheme and a rank indication encoding scheme, and $M_{RI}$ denotes the number of transmitted symbols of rank indication.

Meanwhile, to solve a quantization problem, Equation 26 may be replaced with the following Equation 27.

$$(M_{RE}^{PUSCH} - M_{data}) \cdot N_{data} \geq N_{RI} \cdot \beta_{RI} \cdot M_{data} + N_{CQI} \cdot \beta_{CQI} \cdot M_{data} \qquad \text{[Equation 27]}$$

where $\beta_{CQI}$ denotes a value obtained by quantizing $$10^{\frac{\Delta_{CQI}}{10}},$$

$\beta_{RI}$ denotes a value obtained by quantizing $$10^{\frac{\Delta_{RI}}{10}}.$$

When $N_{data}$, $N_{RI}$, $\beta_{RI}$, $N_{CQI}$, $\beta_{CQI}$ and $M_{RE}^{PUSCH}$ are given $M_{data}$ is the smallest integer satisfying Equation 27.

If $M_{data}$ is obtained, $M_{RI}$ or $M_{CQI}$ is calculated. At this time, a method for calculating $M_{CQI}$ using the following Equation 28 is proposed after calculating $M_{data}$ so that a code rate of rank indication by a ceiling function may be lower than a reference code rate. This is because the rank indication may be more important than CQI/PMI.

$$M_{RE}^{PUSCH} - M_{data} = M_{CQI} + \left\lceil N_{RI} \cdot 10^{\frac{\Delta_{RI}}{10}} \cdot \frac{M_{CQI}}{N_{CQI}} \right\rceil \qquad \text{[Equation 28]}$$

Meanwhile, to solve a quantization problem, Equation 28 may be replaced with Equation 29.

$$(M_{RE}^{PUSCH} - M_{data} - M_{CQI}) \cdot N_{CQI} \geq N_{RI} \cdot \beta_{RI} \cdot M_{CQI} \qquad \text{[Equation 29]}$$

When $M_{data}$, $N_{RI}$, $\beta_{RI}$, $N_{CQI}$, and $M_{RE}^{PUSCH}$ are given, $M_{CQI}$ is the smallest integer satisfying Equation 29.

If $M_{data}$ and $M_{CQI}$ are obtained, $M_{RI}$ may be calculated as follows.

$$M_{RI} = M_{RE}^{PUSCH} - M_{data} - M_{CQI} \quad \text{[Equation 30]}$$

Meanwhile, if $M_{RI}$ is calculated before calculating $M_{CQI}$ the following Equation 31 may be used.

$$M_{RE}^{PUSCH} - M_{data} = M_{RI} + \left\lceil N_{CQI} \cdot 10^{\frac{\Delta_{CQI}}{10}} \cdot \frac{M_{RI}}{N_{RI}} \right\rceil \quad \text{[Equation 31]}$$

To solve a quantization problem, Equation 31 may be replaced with Equation 32.

$$(M_{RE}^{PUSCH} - M_{data} - M_{RI}) \cdot N_{RI} \geq N_{CQI} \beta_{RI} M_{RI} \quad \text{[Equation 32]}$$

When $M_{data}$, $N_{RI}$, $\beta_{RI}$, $N_{CQI}$, and $M_{RE}^{PUSCH}$ are given, $M_{RI}$ is the smallest integer satisfying Equation 32.

If $M_{data}$ and $M_{RI}$ are obtained, $M_{CQI}$ may be calculated as follows.

$$M_{CQI} = M_{RE}^{PUSCH} - M_{data} - M_{RI} \quad \text{[Equation 33]}$$

The reason why $M_{CQI}$ or $M_{RI}$ is calculated after calculating $M_{data}$ by the above methods is that values of $$\frac{M_{data}}{N_{data}}, \frac{M_{CQI}}{N_{CQI}}, \text{ and } \frac{M_{RI}}{N_{RI}}$$

used as a reference MCS are determined to be almost equal.

In the case where a CRC having a different length is attached to each of data and CQI/PMI or a plurality of CRCs is attached to each of the data and CQI/PMI, the values of $$\frac{M_{data}}{N_{data}}, \frac{M_{CQI}}{N_{CQI}}, \text{ and } \frac{M_{RI}}{N_{RI}}$$

may not indicate the substantially same reference MCS. Accordingly, to calculate all the values from one equal reference MCS, Equation 28 may expressed by the following Equation 34.

$$M_{RE}^{PUSCH} - M_{data} = M_{CQI} + \left\lceil N_{RI} \cdot 10^{\frac{\Delta_{RI}}{10}} \cdot \frac{M_{data}}{N_{data}} \right\rceil \quad \text{[Equation 34]}$$

To solve a quantization problem, Equation 34 may be replaced with Equation 35.

$$(M_{RE}^{PUSCH} - M_{data} - M_{CQI}) \cdot N_{data} \geq N_{RI} \beta_{RI} M_{data} \quad \text{[Equation 35]}$$

When $M_{data}$, $N_{data}$, $N_{RI}$, $\beta_{RI}$, and $M_{RE}^{PUSCH}$ are given, $M_{CQI}$ is the smallest integer satisfying Equation 35.

If $M_{data}$ and $M_{CQI}$ are obtained, $M_{RI}$ may be calculated as follows.

$$M_{RI} = M_{RE}^{PUSCH} - M_{data} - M_{CQI} \quad \text{[Equation 36]}$$

Similarly, Equation 31 may be expressed by the following Equation 37. $M_{data}$, $M_{CQI}$, and $M_{RI}$ are calculated using Equation 37.

$$M_{RE}^{PUSCH} - M_{data} = M_{RI} + \left\lceil N_{CQI} \cdot 10^{\frac{\Delta_{CQI}}{10}} \cdot \frac{M_{data}}{N_{data}} \right\rceil \quad \text{[Equation 37]}$$

To solve a quantization problem, Equation 37 may be replaced with the following Equation 38.

$$(M_{RE}^{PUSCH} - M_{data} - M_{RI}) \cdot N_{data} \geq N_{CQI} \beta_{RI} M_{data} \quad \text{[Equation 38]}$$

When $M_{data}$, $N_{data}$, $\beta_{RI}$, $N_{CQI}$, and $M_{RE}^{PUSCH}$ are given, $M_{RI}$ is the smallest integer satisfying Equation 38.

If $M_{data}$ and $M_{RI}$ are obtained, $M_{CQI}$ may be calculated as follows.

$$M_{CQI} = M_{RE}^{PUSCH} - M_{data} - M_{RI} \quad \text{[Equation 39]}$$

In Embodiment 1-B, an order for calculating $M_{data}$, $M_{RI}$, and $M_{CQI}$ are as follows.

(1) Step 1 (step for obtaining $M_{data}$):
$M_{data}$ satisfying $(M_{RE}^{PUSCH} - M_{data}) \cdot N_{data} \geq N_{RI} \beta_{RI} M_{data} + N_{CQI} \beta_{CQI} M_{data}$ is calculated. In this case, when $N_{data}$, $N_{RI}$, $\beta_{RI}$, $N_{CQI}$, $\beta_{CQI}$, and $M_{RE}^{PUSCH}$ are given, $M_{data}$ is the smallest integer satisfying the above equation.

(2) Step 2 (step for obtaining $M_{CQI}$):
$M_{CQI}$ satisfying $(M_{RE}^{PUSCH} - M_{data} - M_{CQI}) \cdot N_{data} \geq N_{RI} \beta_{RI} M_{data}$ is calculated. In this case, when $M_{data}$, $N_{data}$, $N_{RI}$, $\beta_{RI}$, and $N_{RE}^{PUSCH}$ are given, $M_{CQI}$ is the smallest integer data satisfying the above equation.

(3) Step 3 (step for obtaining $M_{RI}$):
$M_{RI}$ is calculated using $M_{RI} = M_{RE}^{PUSCH} - M_{data} - M_{CQI}$.

Embodiment 1-C

In Embodiment 1-A, the reference MCS does not actually consider an accurate code rate and modulation order of information when data, CQI/PMI, and rank indication are transmitted. In Embodiment 1-B, the method for calculating each information field is complicated. In Embodiment 1-C, a method for expressing the reference MCS as a function of a variety of information is proposed using the fact that an MCS of information most approximates to the reference MCS when utilizing Embodiment 1-B. That is, an approximated equation is used as follows.

$$MCS_{ref} \approx \frac{M_{data}}{N_{data}} \approx \frac{M_{CQI}}{N_{CQI}} \approx \frac{M_{RI}}{N_{RI}} \quad \text{[Equation 40]}$$

where reference symbol "$\approx$" indicates that a left value and a right vale are approximately equal.

When defining the reference MCS as the ratio of the number of transmitted symbols of information to a payload size of information, a problem of not being aware of the number of transmitted symbols of information arises. However, since the total number of transmitted symbols is known, the reference MCS may be obtained using the following Equation 41 without calculating the number of transmitted symbols of information.

$$\frac{B_1}{A_1} = \frac{B_2}{A_2} = \frac{B_3}{A_3} = \frac{B_1 + B_2 + B_3}{A_1 + A_2 + A_3} \quad \text{[Equation 41]}$$

Using Equation 41, the following Equation 41 may be induced.

$$MCS_{ref} \approx \frac{M_{data}}{N_{data}} \approx \frac{M_{CQI}}{\beta_{CQI} \cdot N_{CQI}} \approx \quad \text{[Equation 41]}$$

$$\frac{M_{RI}}{\beta_{RI} \cdot N_{RI}} \approx \frac{(M_{data} + M_{CQI} + M_{RI})}{N_{data} + \beta_{CQI} \cdot N_{CQI} + \beta_{RI} \cdot N_{RI}} = M_{RE}^{PUSCH}$$

Even though a variety of information is multiplexed and then transmitted, a UE recognizes the total number of transmitted symbols and a payload size of corresponding information. In addition, even when the number of transmitted symbols of corresponding information is unknown, an approximate reference MCS may be calculated using the fact that the sum of the numbers of transmitted symbols of corresponding information is equal to the total number of symbols transmitted on an UL-SCH.

In this case, since the number of transmitted symbols of corresponding information is determined by an offset value for compensating for a difference in a coding gain or an operation block error rate with respect to data, the reference MCS may be defined as follows.

(1) When data and CQI/PMI are transmitted on a UL-SCH, the reference MCS may be defined by the following Equation 43.

$$MCS_{ref} = \frac{M_{data} + M_{CQI}}{N_{data} + \beta_{CQI} \cdot N_{CQI}} = \frac{M_{RE}^{PUSCH}}{N_{data} + \beta_{CQI} \cdot N_{CQI}} \quad \text{[Equation 43]}$$

(2) When data and rank indication are transmitted on a UL-SCH, the reference MCS may be defined as follows.

$$MCS_{ref} = \frac{M_{data} + M_{RI}}{N_{data} + \beta_{RI} \cdot N_{RI}} = \frac{M_{RE}^{PUSCH}}{N_{data} + \beta_{RI} \cdot N_{RI}} \quad \text{[Equation 44]}$$

(3) When data, CQI/PMI, and rank indication are transmitted on a UL-SCH, the reference MCS may be defined as follows.

$$MCS_{ref} = \frac{M_{data} + M_{CQI} + M_{RI}}{N_{data} + \beta_{CQI} \cdot N_{CQI} + \beta_{RI} \cdot N_{RI}} \quad \text{[Equation 45]}$$

$$= \frac{M_{RE}^{PUSCH}}{N_{data} + \beta_{CQI} \cdot N_{CQI} + \beta_{RI} \cdot N_{RI}}$$

Namely, the reference MCS is defined as a value obtained by dividing the total number of symbols transmitted on a UL-SCH by the sum of payload sizes of transmitted information. At this time, offset values for compensating for a difference with the reference MCS of data such as a difference in an encoding scheme, in an operation block error rate, etc. are multiplied to the payload size of corresponding information.

Therefore, the numbers of actually transmitted symbols of CQI/PMI and rank indication may be calculated using the following Equation 46.

$$M_X = \left\lceil N_X \cdot 10^{\frac{\Delta_X}{10}} \cdot MCS_{ref} \right\rceil = \lceil N_X \cdot \beta_X \cdot MCS_{ref} \rceil \quad \text{[Equation 46]}$$

where $N_X$ denotes a payload size of information X, $\Delta_X$ denotes a parameter expressing, in dB, an offset value for compensating for a difference between a data decoding scheme and an information (X) decoding scheme, and $M_X$ denotes the number of transmitted symbols of information X. In this case, the information X may be CQI/PMI or rank indication.

The number of transmitted symbols of data is a value obtained by subtracting the numbers of transmitted symbols of CQI/PMI and rank indication from the total number of symbols which can be transmitted.

The following examples indicate methods for calculating the number of transmitted symbols of data.

(1) When data and CQI/PMI are transmitted on a UL-SCH, the number of transmitted symbols of data is calculated as follows.

$$M_{data} = M_{RE}^{PUSCH} - M_{CQI} \quad \text{[Equation 47]}$$

(2) When data and rank indication are transmitted on a UL-SCH, the number of transmitted symbols of data is calculated as follows.

$$M_{data} = M_{RE}^{PUSCH} - M_{RI} \quad \text{[Equation 48]}$$

(1) When data, CQI/PMI, and rank indication are transmitted on a UL-SCH, the number of transmitted symbols of data is calculated as follows.

$$M_{data} = M_{RE}^{PUSCH} - M_{CQI} - M_{RI} \quad \text{[Equation 49]}$$

While the case where data is transmitted on a UL-SCH has been described, CQI/PMI and rank indication may be transmitted on the UL-SCH without transmitting the data.

Hereinafter, a method will be described for calculating a code rate of control information when data is not transmitted on a UL-SCH.

In such a case, an eNB informs a UE of only the total number of symbols transmitted on the UL-SCH. Therefore, a reference MCS is not present. A method is proposed for calculating the reference MCS when CQI/PMI and rank indication are transmitted on the UL-SCH.

Embodiment 2-A

In Embodiment 2-A, a method is proposed for calculating a reference MCS using the code rate and modulation order of CQI/PMI under the assumption that only the CQI/PMI is transmitted on a UL-SCH when the CQI/PMI and rank indication are transmitted.

The code rate of the CQI/PMI may be defined as follows.

$$CR_{CQI} = \frac{N_{CQI}}{Q_{CQI} \cdot M_{RE}^{PUSCH}} \quad \text{[Equation 50]}$$

where $CR_{CQI}$ denotes a reference code rate, $N_{CQI}$ denotes a payload size of CQI/PMI, $Q_{CQI}$ denotes a modulation order of CQI/PMI which is a reference modulation order, and $M_{RE}^{PUSCH}$ denotes the number of symbols which can be transmitted through a physical channel when transmitting CQI/PMI on a UL-SCH.

Accordingly, the reference MCS may be calculated as follows.

$$MCS_{ref} = \frac{1}{CR_{CQI} \cdot Q_{CQI}} = \frac{M_{RE}^{PUSCH}}{N_{CQI}} \quad \text{[Equation 51]}$$

Application of Embodiment 2-A

In the Case where CQI/PMI and Rank Indication are Transmitted Together

When CQI/PMI and rank indication are transmitted together, the number of transmitted symbols of the rank indication is calculated first using a reference MCS as shown in the following Equation 52. Next, the number of transmitted symbols of the CQI/PMI is calculated by subtracting the number of transmitted symbols of the rank indication from the total number of symbols which can be transmitted through a physical channel.

$$M_{RI} = \left\lceil N_{RI} \cdot 10^{\frac{\Delta_{RI}}{10}} \cdot MCS_{ref} \right\rceil \quad \text{[Equation 52]}$$

$$M_{CQI} = M_{RE}^{PUSCH} - M_{RI} \quad \text{[Equation 53]}$$

In Equation 52 and Equation 53, $N_{RI}$ denotes a payload size of rank indication, $\Delta_{RI}$ denotes a parameter expressing, in dB, an offset value for compensating for a difference between a block error rate of data and a block error rate of rank indication and a difference between a data encoding scheme and a rank indication encoding scheme, $M_{RI}$ denotes the number of transmitted symbols of rank indication, $M_{RE}^{PUSCH}$ denotes the total number of symbols which can be transmitted through a physical channel, and $M_{CQI}$ denotes the number of transmitted symbols of CQI/PMI.

However, the method described in Embodiment 2-A may be differently implemented in a UE and an eNB as described in Embodiments 1-A and 1-B.

Therefore, to solve such a problem, Equation 52 may be replaced with the following Equation 54.

$$M_{RI} \cdot N_{CQI} \geq N_{RI} \cdot \beta_{RI} \cdot M_{RE}^{PUSCH} \quad \text{[Equation 54]}$$

When $N_{CQI}$, $N_{RI}$, $\beta_{RI}$, and $M_{RE}^{PUSCH}$ are given, $M_{RI}$ is the smallest integer satisfying Equation 54.

If $M_{RI}$ is obtained, $M_{CQI}$ is calculated using Equation 53.

When calculating a code rate of the CQI/PMI using the method described in Embodiment 2-A, an accurate code rate is not applied to information (i.e., CQI/PMI and rank indication). Assuming that a reference code rate is a code rate of the CQI/PMI, the code rate of the CQI/PMI can be determined only when an occupied ratio of rank indication among the entire amount of information should be determined. Namely, the method described in Embodiment 2-A assumes the code rate of the CQI/PMI in an ideal state as the reference code rate under the assumption that only the CQI/PMI is transmitted.

Embodiment 2-B

In Embodiment 2-B, a method is proposed for simultaneously calculating reference code rates of CQI/PMI and rank indication in a closed form using the fact that the total number of transmitted symbols is the sum of the numbers of transmitted symbols of the CQI/PMI and rank indication on a UL-SCH.

Specifically, assuming that a reference MCS is an unknown parameter and the numbers of transmitted symbols of CQI/PMI and rank indication are expressed as a function of the reference MCS, since the total number of transmitted symbols of the CQI/PMI and rank indication is known, an accurate reference MCS can be obtained.

When the CQI/PMI and rank indication are transmitted on the UL-SCH, the total number of symbols transmitted on the UL-SCH may be indicated by the sum of the number of transmitted symbols of the CQI/PMI and the number of transmitted symbols of the rank indication. Accordingly, a reference MCS is calculated using the equation for calculating the number of transmitted symbols of the rank indication and the equation for calculating the number of finally transmitted symbols of the CQI/PMI. The number of transmitted symbols of the rank indication is calculated using the calculated reference MCS and then the number of transmitted symbols of the CQI/PMI is calculated.

Namely, the number of transmitted symbols of the rank indication is calculated using the following Equation 55. In this case, the number of transmitted symbols of the CQI/PMI is expressed as a function of the number of transmitted symbols of the rank indication and a closed-form equation is obtained as shown in the following Equation 56.

$$M_{RE}^{PUSCH} = M_{CQI} + M_{RI} \quad \text{[Equation 55]}$$

$$M_{RE}^{PUSCH} = M_{CQI} + \left\lceil N_{RI} \cdot 10^{\frac{\Delta_{RI}}{10}} \cdot MCS_{ref} \right\rceil \quad \text{[Equation 56]}$$

$$= M_{CQI} + \left\lceil N_{RI} \cdot 10^{\frac{\Delta_{RI}}{10}} \cdot \frac{M_{CQI}}{N_{CQI}} \right\rceil$$

In Equation 54 and Equation 55, $N_{RI}$ denotes a payload size of rank indication, $\Delta_{RI}$ denotes a parameter expressing, in dB, an offset value for compensating for a difference between a block error rate of data and a block error rate of rank indication and a difference between a data encoding scheme and a rank indication encoding scheme, $M_{RI}$ denotes the number of transmitted symbols of rank indication, $M_{RE}^{PUSCH}$ denotes the total number of symbols which can be transmitted through a physical channel, and $M_{CQI}$ denotes the number of transmitted symbols of CQI/PMI.

To solve a quantization problem, Equation 56 may be replaced with the following Equation 57.

$$(M_{RE}^{PUSCH} - M_{CQI}) \cdot N_{CQI} \geq N_{RI} \cdot \beta_{RI} \cdot M_{CQI} \quad \text{[Equation 57]}$$

where $\beta_{RI}$ denotes a value obtained by quantizing $$10^{\frac{\Delta_{RI}}{10}}.$$

When $N_{RI}$, $N_{CQI}$, $\beta_{RI}$, and $M_{RE}^{PUSCH}$ are given, $M_{CQI}$ is the smallest integer satisfying Equation 57.

Embodiment 2-C

Embodiment 2-C uses the same principle as Embodiment 1-C. Since there is no transmitted data, rank indication is calculated first when calculating CQI/PMI. Accordingly, when the rank indication and CQI/PMI are transmitted on a UL-SCH, a reference MCS is defined as follows.

$$MCS_{ref} = \frac{M_{CQI} + M_{RI}}{\beta_{CQI} \cdot N_{CQI} + \beta_{RI} \cdot N_{RI}} \quad \text{[Equation 58]}$$

$$= \frac{M_{RE}^{PUSCH}}{\beta_{CQI} \cdot N_{CQI} + \beta_{RI} \cdot N_{RI}}$$

The number of transmitted symbols of the rank indication is calculated using the following Equation 59. The number of transmitted symbols of the CQI/PMI is a calculated by subtracting the number of transmitted symbols of the rank indication from the total number of symbols transmitted on the UL-SCH.

$$M_X = \left\lceil N_X \cdot 10^{\frac{\Delta_X}{10}} \cdot MCS_{ref} \right\rceil = \lceil N_X \cdot \beta_X \cdot MCS_{ref} \rceil \quad \text{[Equation 59]}$$

where $N_X$ denotes a payload size of information X, $\Delta_X$ denotes a parameter expressing, in dB, an offset value for compensating for a difference between a data decoding scheme and an information (X) decoding scheme, and $M_X$ denotes the number of transmitted symbols of information X. In Equation 59, the information X may correspond to the rank indication.

Embodiment 3

ACK/NACK information is inserted through puncturing multiplexed data, CQI/PMI, and rank indication and thus a code rate of the information can be changed. However, since an eNB does not always know whether or not a UE transmits ACK/NACK information, the number of transmitted symbols of ACK/NACK information is independently calculated using a reference MCS after the number of occupied symbols on a UL-SCH.

When data is present, $$MCS_{ref} = \frac{M_{RE}^{PUSCH}}{N_{data}} \text{ or } MCS_{ref} = \frac{M_{data}}{N_{data}}$$

is used as a reference MCS. When data is not present and only CQI/PMI and rank indication are transmitted on a UL-SCH, $$MCS_{ref} = \frac{M_{RE}^{PUSCH}}{N_{CQI}} \text{ or } MCS_{ref} = \frac{M_{CQI}}{N_{CQI}}$$

is used as the reference MCS. That is, a reference MCS used by ACK/NACK information may be generalizes as $$MCS_{ref} = \frac{M_X}{N_X}$$

and the number of transmitted symbols of the ACK/NACK information may be represented as follows.

$$M_{A/N} = \left\lceil N_{A/N} \cdot 10^{\frac{\Delta_{A/N}}{10}} \cdot MCS_{ref} \right\rceil = \left\lceil N_{A/N} \cdot 10^{\frac{\Delta_{A/N}}{10}} \cdot \frac{M_X}{N_X} \right\rceil \quad \text{[Equation 60]}$$

where $N_{A/N}$ denotes a payload size of ACK/NACK information, and $\Delta_{A/N}$ denotes a parameter expressing, in dB, an offset value for compensating for a difference between a block error rate of data and a block error rate of ACK/NACK information and a difference between a data encoding scheme and a ACK/NACK information encoding scheme, and $M_{A/N}$ denotes the number of finally transmitted symbols of ACK/NACK information.

To solve a quantization problem, a method for calculating the number of transmitted symbols of ACK/NACK information through a physical channel is as follows.

$$M_{A/N} \cdot N_X \geq N_{A/N} \cdot \beta_{A/N} \cdot M_X \quad \text{[Equation 61]}$$

where $\beta_{A/N}$ denotes a value obtained by quantizing $$10^{\frac{\Delta_{A/N}}{10}}.$$

When $M_X$, $N_X$, $\beta_{A/N}$, and $N_{A/N}$ are given, $M_{A/N}$ is the smallest integer satisfying Equation 61.

Embodiment 4

Differently from data or CQI/PMI, ACK/NACK information and rank indication transmitted on a UL-SCH always use quadrature phase shift keying (QPSK) or binary phase shift keying (BPSK) modulation. To implement such a specific modulation scheme, the ACK/NACK and rank indication may use only 4 outermost coordinates (2 outermost coordinates when BPSK is used) of a modulation constellation of the data or CQI/PMI.

Figure 11:
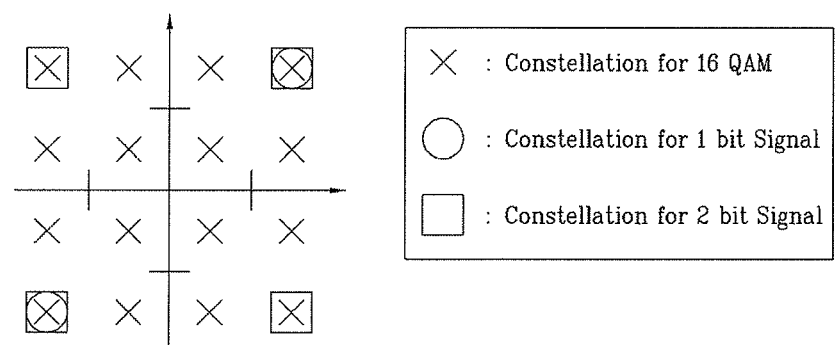
FIG. 11 illustrates an example of modulation constellation coordinates.
Figure 12:
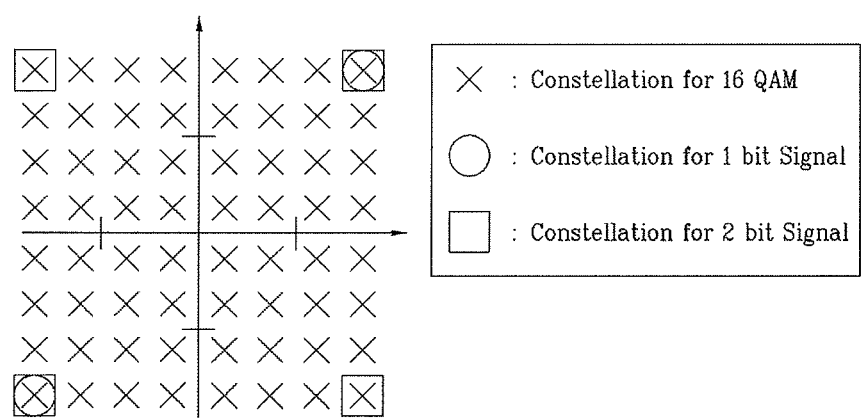
FIG. 12 illustrates an example of modulation constellation coordinates.

FIG. 11 illustrates an example of modulation constellation coordinates used by ACK/NACK information and rank indication when data and CQI/PMI use a 16 quadrature amplitude modulation (QAM) scheme. FIG. 12 illustrates an example of modulation constellation coordinates used by ACK/NACK information and rank indication when data and CQI/PMI use a 64 QAM scheme.

As illustrated in FIGS. 11 and 12, if ACK/NACK information and rank indication use the 4 outermost coordinates, since the locations of symbols of the ACK/NACK information and rank indication may be farthest away from each other in terms of Euclidean distance, performance may be improved.

However, if only the outermost coordinates are used on modulation constellation coordinates, an average power of transmission of ACK/NACK information and rank indication is greater than 1 under the assumption that an average power of transmission of data and CQI/PMI is 1. Accordingly, when calculating the number of transmitted symbols of the ACK/NACK information and rank indication on a UL-SCH, if a modulation order of the data or CQI/PMI is 16 QAM or 64 QAM, a method is proposed for calculating the number of transmitted symbols of the ACK/NACK information and rank indication on the UL-SCH using an additional compensation offset parameter $$\beta_{QAM} = 10^{\frac{\Delta_{QAM}}{10}}$$

in addition to a compensation offset parameter $$\beta_{A/N} = 10^{\frac{\Delta_{A/N}}{10}}$$

or $$\beta_{RI} = 10^{\frac{\Delta_{RI}}{10}}.$$

When the modulation order of the data or CQI/PMI is QPSK, $M_{A/N}$ and $M_{RI}$ are calculated using the above-described Embodiments 1-A, 1-B, 2-A, and 2-B. When the modulation order of the data or CQI/PMI is 16 QAM, the number of symbols of corresponding information is calculated using $$\hat{\beta}_{RI} = \beta_{RI} \cdot \beta_{16QAM} = 10^{\frac{\Delta_{RI}+\Delta_{16QAM}}{10}}$$

or $$\hat{\beta}_{A/N} = \beta_{A/N} \cdot \beta_{16QAM} = 10^{\frac{\Delta_{A/N}+\Delta_{16QAM}}{10}}$$

instead of $$\beta_{RI} = 10^{\frac{\Delta_{RI}}{10}}$$

or $$\beta_{A/N} = 10^{\frac{\Delta_{A/N}}{10}}$$

in Embodiments 1-A, 1-B, 2-A, and 2-B.

When the modulation order of the data or CQI/PMI is 64 QAM, the number of symbols of information is calculated using $$\hat{\beta}_{RI} = \beta_{RI} \cdot \beta_{16QAM} = 10^{\frac{\Delta_{RI}+\Delta_{64QAM}}{10}}$$

or $$\hat{\beta}_{A/N} = \beta_{A/N} \cdot \beta_{64QAM} = 10^{\frac{\Delta_{A/N}\Delta_{64QAM}}{10}}$$

instead of $$\beta_{RI} = 10^{\frac{\Delta_{RI}}{10}}$$

or $$\beta_{A/N} = 10^{\frac{\Delta_{A/N}}{10}}$$

in Embodiments 1-A, 1-B, 2-A, and 2-B.

To compensate for a difference in power of the ACK/NACK information and the rank indication when using 16 QAM or 64 QAM as the modulation order of the data or CQI/PMI, offset values $$\beta_{A/N} = 10^{\frac{\Delta_{A/N}}{10}}$$

and $$\beta_{RI} = 10^{\frac{\Delta_{RI}}{10}}$$

of the ACK/NACK information and the rank indication may be set differently according to the modulation order. Therefore, a corresponding offset value is used according to the modulation order of the data or the CQI/PMI.

Embodiment 5

The maximum numbers of transmissible symbols of rank indication and ACK/NACK information may be limited. As a method proposed in the present invention, when calculating $M_{A/N}$ which is the numbers of transmitted symbols of the ACK/NACK information, if $M_{A/N}$ is greater than the maximum number of transmissible symbols of ACK/NACK information, $M_{A/N}$ is set to the maximum numbers of transmissible symbols of the ACK/NACK information. In addition, when calculating $M_{RI}$ which is the numbers of transmitted symbols of the ACK/NACK information, if $M_{RI}$ is greater than the maximum number of transmissible symbols of rank indication, $M_{RI}$ is set to the maximum numbers of transmissible symbols of the rank indication. The maximum numbers or values of $M_{A/N}$ and $M_{RI}$ may be $12 \times N_{RB} \times 4$. Herein, $N_{RB}$ denotes the number of resource blocks (RBs) transmitted through a physical uplink shared channel (PUSCH). If one RB is transmitted through the PUSCH, the maximum values of $M_{A/N}$ and $M_{RI}$ are 48.

As in Embodiment 1-B, if the data, CQI/PMI, and rank indication are multiplexed, the number of transmitted symbols of the rank indication may be calculated last according to circumstances. Then it is confirmed whether the number $M_{RI}$ of transmitted symbols of the rank indication exceeds a maximum transmissible value. If $M_{RI}$ exceeds the maximum value, $M_{RI}$ is limited to the maximum value and symbols of the data or CQI/PMI corresponding to a difference between the calculated $M_{RI}$ and the maximum transmissible value are further transmitted.

Embodiment 6

In some cases, a reference code rate greater than 1 may be set or calculated. If the reference code rate is greater than 1, CQI/PMI, rank indication, and ACK/NACK information are not decoded in an eNB and a UE may transmit unnecessary information. In this case, the number of transmitted symbols of the CQI/PMI, rank indication, and ACK/NACK information may be set to 0 and only data may be transmitted.

To efficiently use one uplink, an eNB may not generate a circumstance having a code rate greater than 1. If a UE senses such a circumstance, it is determined that the eNB has made a mistake or the UE has read different control information so that no information may be transmitted to the uplink.

Embodiment 7

In a communication system, if an error occurs in a data packet due to failure of receipt after the data packet is transmitted, the corresponding data packet is re-transmitted. Retransmission may be commended by eNB or may be performed via a predetermined schedule.

Figure 13:
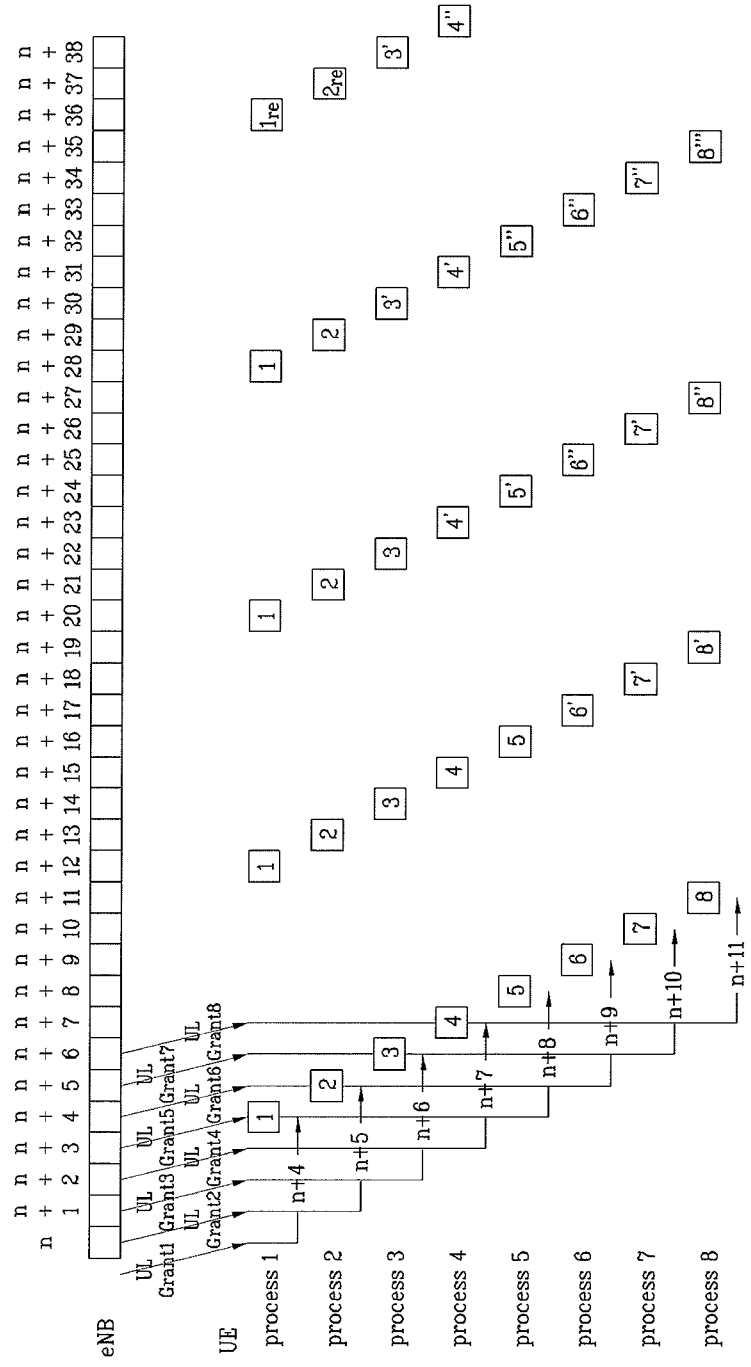
FIG. 13 describes HARQ (Hybrid Automatic Repeat request) process for explaining data retransmission.

FIG. 13 shows a HARQ process for explaining data retransmission. As shown in FIG. 13, it is configured that maximum process is set to be 8 processes and maximum retransmission time is set to be 4. In each process, when the UE receives UL_Grant from the eNB at $n_{th}$ subframe timing, the UE start to transmit data in n+4$^{th}$ subframe.

For example, in process 1, if the UE does not receive ACK from the eNB during 3 times retransmission of data (e.g., denoted by '1' in FIG. 13) stored in a buffer after starting to transmit data in a n+4$_{th}$ subframe, the UE performs buffer flush, reconstructs the data and transmits the reconstructed data (e.g., denoted by $1_{re}$ in FIG. 13). Process 2 is an identical case to the process 1. In Process 3, if the UE receives ACK from the eNB after retransmitting data (e.g., dented by 3 in FIG. 13) 2 times, the UE transmits new data (e.g., denoted by 3' in FIG. 13) at 4$^{th}$ transmission timing. In addition, in process 3, if the UE does not receive ACK from the eNB after transmitting the new data, the UE retransmits the new data at 5$^{th}$ transmission timing. Processes 4 to 6 can be explained as described above. In addition, each of processes 1 to 8 is operated independently.

In the case where re-transmission occurs, if decoding is performed using an initially received data packet and a data packet received by re-transmission, a success probability of receiving the data packet is increased even though not all resources employed when the data packet is initially transmitted are used.

For example, when the communication system operates such that the initial data packet is transmitted without errors with a probability of 90%, the system does not encounter any problem even when the data packet is re-transmitted at a code rate higher than a code rate of the initial data packet. Transmitting a data packet at a high code rate means that less physical transmission resources are used than during the initial transmission of the data packet.

In the present invention, a method for calculating a reference MCS using a packet size of data and the total number of symbols which can be transmitted through a PUSCH and a method for calculating the number of transmitted symbols of CQI/PMI and rank indication using the reference MCS have been proposed.

However, even though a lower number of symbols of data is transmitted than during initial transmission, no problem occurs in system operation and efficiency may be improved. Accordingly, a lower number of total symbols on a PUSCH may be allocated during re-transmission of data. At this time, CQI/PMI and/or rank indication may be multiplexed with re-transmitted data and then may be transmitted.

Figure 14:
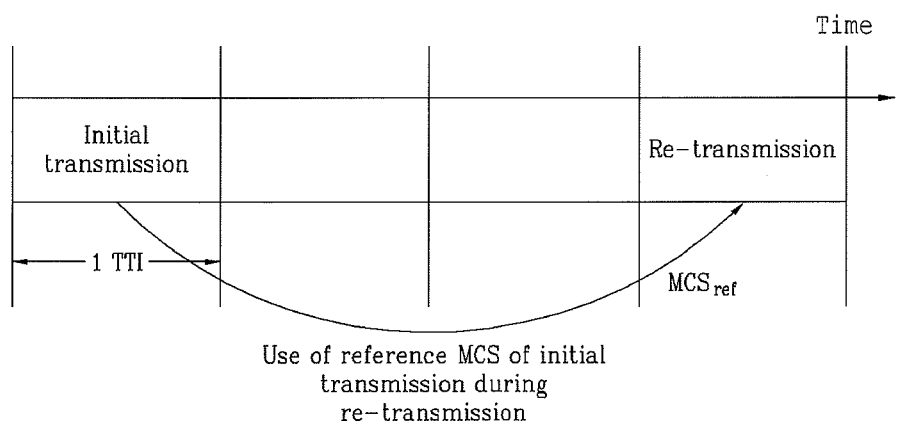
FIG. 14 is a diagram explaining a use relationship of a reference MCS during re-transmission of data.

If the reference MCS is calculated using the total number of symbols which can be transmitted at a corresponding PUSCH transmission time, a code rate which can stably transmit the CQI/PMI and/or the rank indication may not be set. FIG. 14 is a diagram explaining a use relationship of a reference MCS during re-transmission of data. As illustrated in FIG. 14, while data is re-transmitted through a PUSCH, a method for calculating the numbers of transmitted symbols of CQI/PMI, rank indication, and ACK/NACK information is proposed using a code rate used during the initial transmission of data.

More specifically, a reference MCS in the following Equation 62 to calculate the number of transmitted symbols of information X employs a reference MCS used when data is initially transmitted.

$$M_X = \left\lceil N_X \cdot 10^{\frac{\Delta_X}{10}} \cdot MCS_{ref} \right\rceil \quad \text{[Equation 62]}$$

where $MCS_{ref}$ denotes a reference MCS when the data is initially transmitted, $N_X$ denotes a payload size of information X, $\Delta_X$ denotes a parameter expressing, in dB, an offset value for compensating for a difference between the decoding scheme of data and the decoding scheme of the information X, and $M_X$ denotes the number of transmitted symbols of information X. The information X can be CQI/PMI, rank indication or ACK/NACK information.

The equation 62 can be expressed by the following equation 63.

$$Q' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil \quad \text{[Equation 63]}$$

In the Equation 63, Q' is the number of transmitted symbols of the control information (e.g., CQI/PMI, rank indication or ACK/NACK information) when the data is retransmitted, O is the payload size of the control information when the data is retransmitted. $N_{symb}^{PUSCH\text{-}initial}$ is a number of SC-FDMA symbols per subframe for Physical Uplink Shared Channel (PUSCH) transmission when the data is initially transmitted and $M_{sc}^{PUSCH\text{-}initial}$ is a scheduled bandwidth PUSCH transmission when the data is initially transmitted. Thus, $M_{sc}^{PUSCH\text{-}initial} \cdot N_{symb}^{PUSCH\text{-}initial}$ number of transmissible symbols of Physical Uplink Shared Channel (PUSCH) when the data is initially transmitted.

$\beta_{offset}^{PUSCH}$ is the offset value.

$$\sum_{r=0}^{C-1} K_r$$

is the payload size of the data when the data is initially transmitted, r is code block number of the data before channel coding, $K_r$ is a number of bits in code block number r, and C is a total number of code blocks.

In an LTE system, when a data packet is re-transmitted, redundancy version (RV) numbers are assigned according to a re-transmission form. However, in transmission through a PUSCH, RV numbers 1, 2, and 3 among RV numbers 0, 1, 2, and 3 are used only for re-transmission. Therefore, if data is transmitted during PUSCH transmission with the RV number 1, 2, or 3, the numbers of transmitted symbols of CQI/PMI, rank indication, and ACK/ACK information are calculated using a reference MCS when data is transmitted with the RV number 0. Namely, if data is retransmitted, the numbers of transmitted symbols of CQI/PMI, rank indication, and ACK/ACK information are calculated by using the equation 63.

In embodiment 7, a function of each module of a UE during re-transmission of the data is as follows.

Figure 15:
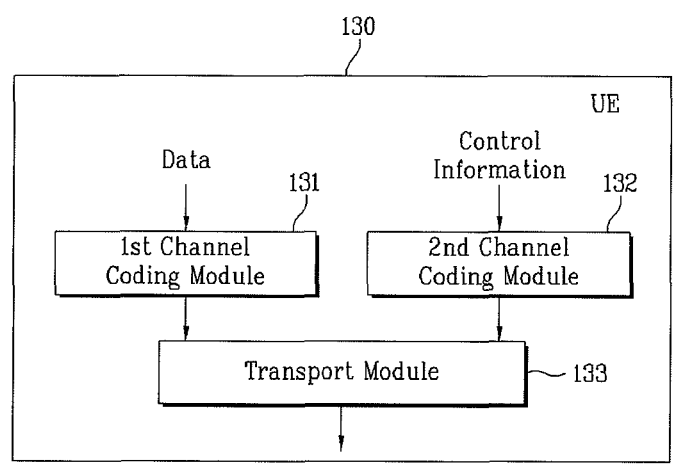
FIG. 15 is a block diagram of a UE according to an exemplary embodiment of the present invention.

FIG. 15 is a block diagram of a UE according to an exemplary embodiment of the present invention. A UE 130 includes a first channel coding module 131, a second channel coding module 132, and a transport module 133. The UE 130 may further include modules such as a multiplexing module, a transport module, and an interleaving module but these are omitted for convenience of description.

The first channel coding module 131 performs channel coding upon data to be re-transmitted. The second channel coding module 132 performs channel coding upon control information.

The second channel coding module 132 calculates the number of transmitted symbols of the control channel by using the Equation 63.

The transport module 133 performs channel interleaving upon the first channel-coded data and the second channel-coded control information and transmits the interleaved uplink signal to an uplink.

According to the above-described configuration, a code rate for stably transmitting the CQI/PMI and/or rank indication during re-transmission of data can be set.

As is apparent from the above description, when data and control information are transmitted via an uplink channel, an uplink signal including the data and control information can be transmitted by accurately calculating code rates of the data and control information.

The present invention may be applied to a UE, an eNB or other equipment of a radio mobile communication system. If applied to an eNB, the eNB performs a deinterleaving and decoding operation to derive the signal from the encoded/interleaved signal sent by the UE.

Figure 16:
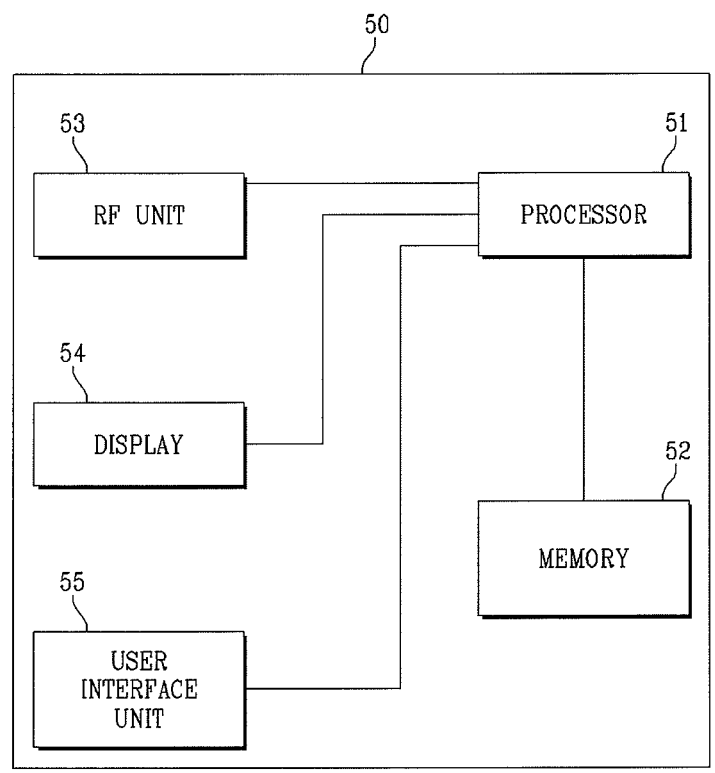
FIG. 16 is a block diagram showing constitutional elements of a device 50 that can be either a UE or an eNB.

FIG. 16 is a block diagram showing constitutional elements of a device 50, that can be either a UE or an eNB, and that can perform the methods described above. Device 50 includes a processor 51, a memory 52, a radio frequency (RF)

unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device 50 is a UE, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

The embodiments described above are provided by combining constituent elements and features of the present invention in specific forms. The constituent elements or features of the present invention may be considered optional if not explicitly stated otherwise. The constituent elements or features may be implemented without being combined with other constituent elements or features. The embodiments of the present invention may also be provided by combining some of the constituent elements and/or features. The order of operations in the embodiments of the present invention may be changed. Some constituent elements or features of one embodiment may be included in another embodiment or may be replaced with corresponding constituent elements or features of another embodiment. It is apparent that the present invention may be embodied by a combination of claims which do not have an explicit cited relation in the appended claims or may include new claims by amendment after application.

The embodiments of the present invention have been described focusing on the data communication relationship between an eNB and a UE. Here, the eNB refers to a terminal node of a network communicating directly with the UE. In some cases, a specific operation described as being performed by the eNB may be performed by an upper node of the eNB.

Namely, it is apparent that the eNB or any other network nodes may perform various operations for communication with the UE in a network comprised of a plurality of network nodes including the eNB. The term 'eNB' may be replaced with the term 'fixed station', 'Node B', 'access point', etc. The term 'UE' corresponds to a mobile station (MS) and the MS may be replaced with the term 'subscriber station' (SS), 'mobile subscriber station' (MSS), 'mobile terminal', etc.

The UE employed in the present invention may be a personal digital assistant (PDA), a cellular phone, a personal communication service (PCS) phone, a global system for mobile (GSM) phone, a wideband code division multiple access (wide CDMA) phone, a mobile broadband system (MBS) phone, etc.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

What is claimed is:

1. A method of transmitting control information via a Physical Uplink Shared Channel (PUSCH) in a $3^{rd}$ Generation Partnership Project (3GPP) wireless communication system, wherein the PUSCH is used for re-transmission of an Uplink Shared Channel (UL-SCH) transport block, the method comprising:
channel coding the control information based on a number of coded symbols of the control information to produce channel coded control information,
wherein the number of coded symbols of the control information is determined by using the expression:

$$Q' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil,$$

wherein:
Q' is the number of the coded symbols of the control information,
⌈ ⌉ is a ceiling function,
O is a payload size of the control information,
$N_{symb}^{PUSCH\text{-}initial}$ is a number of Single Carrier Frequency Division Multiple Access (SC-FDMA) symbols per subframe for an initial PUSCH transmission of the UL-SCH transport block,
$N_{sc}^{PUSCH\text{-}initial}$ is a number of subcarriers representing a scheduled bandwidth for the initial PUSCH transmission of the UL-SCH transport block,
$\beta_{offset}^{PUSCH}$ is an offset value,
r is a code block number for the UL-SCH transport block,
$K_r$ is a number of bits in code block number r, and
C is a total number of code blocks,
wherein the control information is one of channel quality control information, a rank indication and acknowledgement (ACK)/negative acknowledgement (NACK) information, and
wherein the channel quality control information includes at least one of Channel Quality Information (CQI) and a Precoding Matrix Indicator (PMI).

2. The method of claim 1, further comprising:
channel coding the UL-SCH transport block to produce a channel coded UL-SCH transport block;
channel interleaving the channel coded control information and the channel coded UL-SCH transport block to generate an uplink signal; and
transmitting the uplink signal via the PUSCH.

3. The method of claim 1, further comprising:
retrieving parameters for the UL-SCH transport block and resources for the initial PUSCH transmission of the UL-SCH transport block from a memory or a cache.

4. A method of processing control information received via a Physical Uplink Shared Channel (PUSCH) in a 3$^{rd}$ Generation Partnership Project (3GPP) wireless communication system, wherein the PUSCH is used for re-transmission of an Uplink Shared Channel (UL-SCH) transport block, the method comprising:

channel decoding the control information based on a number of coded symbols of the control information to produce channel decoded control information, wherein the number of coded symbols of the control information is determined by using the expression:

$$Q' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil,$$

wherein:

Q' is the number of the coded symbols of the control information,

⌈ ⌉ is a ceiling function,

O is a payload size of the control information, $N_{symb}^{PUSCH\text{-}initial}$ is a number of Single Carrier Frequency Division Multiple Access (SC-FDMA) symbols per subframe for an initial PUSCH transmission of the UL-SCH transport block, $M_{sc}^{PUSCH\text{-}initial}$ is a number of subcarriers representing a scheduled bandwidth for the initial PUSCH transmission for the UL-SCH transport block, $\beta_{offset}^{PUSCH}$ is an offset value, r is a code block number for the UL-SCH transport block, $K_r$ is a number of bits in code block number r, and C is a total number of code blocks, wherein the control information is one of channel quality control information, a rank indication and acknowledgement (ACK)/negative acknowledgement (NACK) information, and wherein the channel quality control information includes at least one of Channel Quality Information (CQI) and a Precoding Matrix Indicator (PMI).

5. The method of claim 4, further comprising:

receiving an uplink signal via the PUSCH;

channel de-interleaving the uplink signal to generate the control information and the UL-SCH transport block; and channel decoding the UL-SCH transport block to produce a channel decoded transport block.

6. The method of claim 4, further comprising:

retrieving parameters for the UL-SCH transport block and resources for the initial PUSCH transmission of the UL-SCH transport block from a memory or a cache.

7. An apparatus configured to transmit control information via a Physical Uplink Shared Channel (PUSCH) in a 3$^{rd}$ Generation Partnership Project (3GPP) wireless communication system, wherein the PUSCH is used for re-transmission of an Uplink Shared Channel (UL-SCH) transport, the apparatus comprising:

a radio frequency (RF) unit;

a memory; and a processor operatively connected to the RF unit and the memory, the processor configured to channel code the control information based on a number of coded symbols of the control information to produce channel coded control information, wherein the number of coded symbols of the control information is determined by using the expression:

$$Q' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil,$$

wherein:

Q' is the number of the coded symbols of the control information,

⌈ ⌉ is a ceiling function,

O is a payload size of the control information, $N_{symb}^{PUSCH\text{-}initial}$ is a number of Single Carrier Frequency Division Multiple Access (SC-FDMA) symbols per subframe for an initial PUSCH transmission of the UL-SCH transport block, $M_{sc}^{PUSCH\text{-}initial}$ is a number of subcarriers representing a scheduled bandwidth for the initial PUSCH transmission for the UL-SCH transport block, $\beta_{offset}^{PUSCH}$ is an offset value, r is a code block number for the UL-SCH transport block, $K_r$ is a number of bits in code block number r, and C is a total number of code blocks, wherein the control information is one of channel quality control information, a rank indication and acknowledgement (ACK)/negative acknowledgement (NACK) information, and wherein the channel quality control information includes at least one of Channel Quality Information (CQI) and a Precoding Matrix Indicator (PMI).

8. The apparatus of claim 7, wherein the processor is further configured to:

channel code the UL-SCH transport block to produce a channel coded UL-SCH transport block;

channel interleave the channel coded control information and the channel coded UL-SCH transport block to generate an uplink signal; and transmit the uplink signal via the PUSCH.

9. The apparatus of claim 7, wherein the processor is further configured to:

retrieve parameters for the UL-SCH transport block and resources for the initial PUSCH transmission of the UL-SCH transport block from a memory or a cache.

10. An apparatus configured to process control information received via a Physical Uplink Shared Channel (PUSCH) in a 3$^{rd}$ Generation Partnership Project (3GPP) wireless communication system, wherein the PUSCH is used for re-transmission of an Uplink Shared Channel (UL-SCH) transport block, the apparatus comprising:

a radio frequency (RF) unit;

a memory; and a processor operatively connected to the RF unit and the memory, the processor configured to channel decode the control information based on a number of coded symbols of the control information to produce channel decoded control information, wherein the number of coded symbols of the control information is determined by using the expression:

$$Q' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil,$$

wherein:

Q' is the number of the coded symbols of the control information,

⌈ ⌉ is a ceiling function,

O is a payload size of the control information, $N_{symb}^{PUSCH\text{-}initial}$ is a number of Single Carrier Frequency Division Multiple Access (SC-FDMA) symbols per subframe for an initial PUSCH transmission of the UL-SCH transport block, $M_{sc}^{PUSCH\text{-}initial}$ is a number of subcarriers representing a scheduled bandwidth for the initial PUSCH transmission for the UL-SCH transport block, $\beta_{offset}^{PUSCH}$ is an offset value, r is a code block number for the UL-SCH transport block, $K_r$ is a number of bits in code block number r, and C is a total number of code blocks, wherein the control information is one of channel quality control information, a rank indication and acknowledgement (ACK)/negative acknowledgement (NACK) information, and wherein the channel quality control information includes at least one of Channel Quality Information (CQI) and a Precoding Matrix Indicator (PMI).

11. The apparatus of claim 10, wherein the processor is further configured to:
receive an uplink signal via the PUSCH;
channel de-interleave the uplink signal to generate the control information and the UL-SCH transport block; and
channel decode the UL-SCH transport block to produce a channel decoded transport block.

12. The apparatus of claim 10, wherein the processor is further configured to:
retrieve parameters for the UL-SCH transport block and resources for the initial PUSCH transmission of the UL-SCH transport block from a memory or a cache.

13. The method of claim 1, wherein a payload size of the channel quality control information includes a size of Cyclic Redundancy Check (CRC) attached to the channel quality control information.

14. The method of claim 4, wherein a payload size of the channel quality control information includes a size of Cyclic Redundancy Check (CRC) attached to the channel quality control information.

15. The apparatus of claim 7, wherein a payload size of the channel quality control information includes a size of Cyclic Redundancy Check (CRC) attached to the channel quality control information.

16. The apparatus of claim 10, wherein a payload size of the channel quality control information includes a size of Cyclic Redundancy Check (CRC) attached to the channel quality control information.

* * * * *